(12) United States Patent
Hsu et al.

(10) Patent No.: US 8,179,616 B1
(45) Date of Patent: May 15, 2012

(54) OPTICAL LENS ASSEMBLY FOR IMAGE TAKING

(75) Inventors: Po-Lun Hsu, Taichung (TW); Hsin-Hsuan Huang, Taichung (TW)

(73) Assignee: Largan Precision, Co., Taichung (TW)

( * ) Notice: Subject to any disclaimer, the term of this patent is extended or adjusted under 35 U.S.C. 154(b) by 0 days.

(21) Appl. No.: 13/183,022

(22) Filed: Jul. 14, 2011

(30) Foreign Application Priority Data

Jan. 20, 2011 (TW) .............................. 100102191 A

(51) Int. Cl.
*G02B 3/02* (2006.01)
*G02B 9/34* (2006.01)
(52) U.S. Cl. ..................... 359/715; 359/771; 359/781
(58) Field of Classification Search .................. 359/715, 359/771, 781
See application file for complete search history.

(56) References Cited

U.S. PATENT DOCUMENTS

| 6,043,941 | A | 3/2000 | Yamada et al. |
| 7,768,719 | B2 | 8/2010 | Jung et al. |
| 2003/0161054 | A1 | 8/2003 | Sato |
| 2009/0080089 | A1 | 3/2009 | Hirose |
| 2010/0157443 | A1 | 6/2010 | Goto et al. |
| 2010/0231686 | A1 | 9/2010 | Goto et al. |

FOREIGN PATENT DOCUMENTS

| EP | 2009476 A1 | 12/2008 |
| EP | 2056151 A1 | 6/2009 |
| WO | 2010007845 A1 | 6/2009 |

*Primary Examiner* — Jack Dinh
(74) *Attorney, Agent, or Firm* — Wang Law Firm, Inc.; Li K. Wang

(57) ABSTRACT

An optical lens assembly for image taking, sequentially arranged from an object side to an image side, comprises: the first lens element with refractive power, the second lens element with positive refractive power, the third lens element with negative refractive power having a concave object-side surface and a convex image-side surface, the fourth lens element with positive refractive power having a convex object-side surface. The optical lens assembly further comprises a stop and an image sensor on an image plane. Each of the third and the fourth lens elements can have at least one aspherical surface. When the optical lens assembly utilizes the thickness conditions provided in the present invention, along with a favorable entrance pupil diameter ratio, fine aberration corrections, wide-angle of view, and functionalities for common image pickup cameras or those used with infrared settings can be achieved.

23 Claims, 26 Drawing Sheets

Table 1
(Embodiment 1)
f = 5.08 mm, f/EPD = 0.97, HFOV = 44.6 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | 33.35050 (ASP) | 1.189 | Plastic | ARTON-D4532 | 1.507 | -17.66 |
| 2 | | 6.96990 (ASP) | 3.311 | | | | |
| 3 | Ape. Stop | Plano | 1.345 | | | | |
| 4 | Lens 2 | -9.66360 (ASP) | 2.980 | Plastic | MGC EP5000 | 1.615 | 8.16 |
| 5 | | -3.68940 (ASP) | 2.218 | | | | |
| 6 | Lens 3 | -2.69495 (ASP) | 2.220 | Plastic | ARTON-D4532 | 1.507 | -7.77 |
| 7 | | -10.92150 (ASP) | 0.070 | | | | |
| 8 | Lens 4 | 3.59510 (ASP) | 3.000 | Plastic | MGC EP5000 | 1.615 | 5.71 |
| 9 | | -100.00000 (ASP) | 2.500 | | | | |
| 10 | IR-filter | Plano | 0.700 | Glass | BSC7 | 1.517 | - |
| 11 | | Plano | 2.510 | | | | |
| 12 | Image | Plano | - | | | | |

Note: Reference wavelength is 850.0 nm. ASP stands for aspherical surfaces. Effective radius of the surface #9 is 5.55mm.

FIG. 8

Table 2
(Aspheric Coefficients)

| Surface # | 1 | 2 | 4 | 5 |
|---|---|---|---|---|
| k = | 0.00000E+00 | 0.00000E+00 | 0.00000E+00 | -4.48869E-01 |
| A4 = | 2.81929E-03 | 3.26917E-03 | -3.41315E-03 | 2.90873E-03 |
| A6 = | -7.98925E-05 | 1.08030E-04 | -2.45310E-04 | -2.67720E-04 |
| A8 = | 1.68989E-06 | -9.72866E-06 | 6.79392E-05 | 1.98134E-05 |
| A10 = | -3.07540E-08 | 1.31390E-07 | -1.17459E-05 | 4.82117E-08 |
| A12 = | 1.47885E-10 | -8.71117E-09 | 5.59964E-07 | -1.04818E-07 |
| A14 = | | 1.92362E-10 | | 4.34446E-09 |

| Surface # | 6 | 7 | 8 | 9 |
|---|---|---|---|---|
| k = | -4.78509E+00 | 6.82493E-02 | -4.90718E+00 | 0.00000E+00 |
| A4 = | 3.06957E-03 | -1.23257E-03 | 1.67337E-03 | 2.40664E-03 |
| A6 = | -1.13648E-04 | 2.90587E-05 | -4.49740E-05 | -9.15837E-05 |
| A8 = | 8.00157E-07 | -1.50698E-06 | 2.29557E-06 | 9.05636E-06 |
| A10 = | 3.99538E-08 | 4.77850E-09 | -4.04568E-08 | -3.63448E-07 |
| A12 = | -5.89651E-10 | 1.18529E-09 | -3.08559E-10 | 4.18366E-09 |
| A14 = | -3.24888E-12 | -2.20105E-11 | | |

FIG. 9

Table 3
(Embodiment 2)
f = 4.68 mm, f/EPD = 0.95, HFOV = 40.8 deg.

| Surface # | | Curvature Radius | Thickness | Material | Index | Focal length |
|---|---|---|---|---|---|---|
| 0 | Object | Plano | Infinity | | | |
| 1 | Lens 1 | 100.00000 (ASP) | 1.288 | Plastic | 1.569 | -16.58 |
| 2 | | 8.57847 (ASP) | 3.620 | PC | | |
| 3 | Ape. Stop | Plano | 1.133 | | | |
| 4 | Lens 2 | -24.27296 (ASP) | 3.000 | Plastic | 1.527 | 7.44 |
| 5 | | -3.51965 (ASP) | 0.986 | ZEONEX F52R | | |
| 6 | Lens 3 | -3.04628 (ASP) | 3.000 | Plastic | 1.527 | -11.25 |
| 7 | | -8.39437 (ASP) | 0.296 | ZEONEX F52R | | |
| 8 | Lens 4 | 5.55874 (ASP) | 3.000 | Plastic | 1.569 | 7.00 |
| 9 | | -11.30987 (ASP) | 2.500 | PC | | |
| 10 | IR-filter | Plano | 0.700 | Glass | 1.517 | - |
| 11 | | Plano | 2.978 | BSC7 | | |
| 12 | Image | Plano | - | | | |

Note: Reference wavelength is 850.0 nm. ASP stands for aspherical surfaces. Effective radius of the surface #5 is 4.03mm.

FIG. 10

Table 4
(Aspheric Coefficients)

| Surface # | 1 | 2 | 4 | 5 |
|---|---|---|---|---|
| k = | 0.00000E+00 | -2.70019E-02 | 0.00000E+00 | -9.78502E-01 |
| A4 = | 4.41304E-03 | 5.55489E-03 | -1.15825E-03 | 4.72209E-03 |
| A6 = | -1.58919E-04 | -4.51001E-05 | -1.48805E-03 | -2.58151E-04 |
| A8 = | 5.40909E-06 | 5.03682E-06 | 3.49476E-04 | 2.23590E-05 |
| A10 = | -9.51955E-08 | -3.18979E-07 | -3.82797E-05 | -1.29175E-06 |
| A12 = | 6.57826E-10 | | 1.33868E-06 | -3.41269E-08 |
| A14 = | | | | 2.70316E-09 |

| Surface # | 6 | 7 | 8 | 9 |
|---|---|---|---|---|
| k = | -3.42670E+00 | -3.40163E-01 | -1.46906E+01 | 0.00000E+00 |
| A4 = | 6.43116E-03 | -1.49472E-04 | 2.04675E-03 | 1.20904E-04 |
| A6 = | -1.57591E-04 | 2.94160E-05 | -3.14502E-04 | -3.71954E-05 |
| A8 = | -1.93984E-06 | -1.08345E-07 | 1.88683E-05 | 2.82030E-06 |
| A10 = | 6.97749E-08 | -3.54430E-08 | -6.34981E-07 | -1.24927E-07 |
| A12 = | 1.64147E-09 | -6.27593E-10 | 8.00873E-09 | 1.88217E-09 |
| A14 = | -3.82798E-11 | 2.98160E-11 | | |

FIG. 11

Table 5
(Embodiment 3)
f = 4.84 mm, f/EPD = 0.97, HFOV = 40.2 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | 99.65158 (ASP) | 2.198 | Plastic | PC | 1.569 | -18.72 |
| 2 | | 9.54556 (ASP) | 3.220 | | | | |
| 3 | Ape. Stop | Plano | 1.223 | | | | |
| 4 | Lens 2 | -13.80397 (ASP) | 3.001 | Plastic | ZEONEX F52R | 1.527 | 7.19 |
| 5 | | -3.19407 (ASP) | 1.252 | | | | |
| 6 | Lens 3 | -2.75665 (ASP) | 2.998 | Plastic | ZEONEX F52R | 1.527 | -10.84 |
| 7 | | -7.33050 (ASP) | 0.072 | | | | |
| 8 | Lens 4 | 4.39263 (ASP) | 2.863 | Plastic | PC | 1.569 | 7.09 |
| 9 | | -37.30729 (ASP) | 2.000 | | | | |
| 10 | IR-filter | Plano | 0.700 | Glass | BSC7 | 1.517 | - |
| 11 | | Plano | 2.976 | | | | |
| 12 | Image | Plano | - | | | | |

Note: Reference wavelength is 850.0 nm. ASP stands for aspherical surfaces.
Effective radius of the surface #7 is 5.65mm.

FIG. 12

Table 6
(Aspheric Coefficients)

| Surface # | 1 | 2 | 4 | 5 |
|---|---|---|---|---|
| k = | 0.00000E+00 | 3.86391E+00 | 0.00000E+00 | -1.06994E+00 |
| A4 = | 2.69094E-03 | 4.46302E-03 | -3.83239E-03 | 5.23779E-03 |
| A6 = | -7.22482E-05 | -1.94547E-04 | -3.53758E-04 | -3.82066E-04 |
| A8 = | 2.14650E-06 | 1.80438E-05 | 1.49483E-04 | 2.69543E-05 |
| A10 = | -3.21021E-08 | -7.65714E-07 | -2.43538E-05 | -1.50177E-06 |
| A12 = | 2.09873E-10 | | 1.04430E-06 | -2.47939E-08 |
| A14 = | | | | 2.87305E-09 |

| Surface # | 6 | 7 | 8 | 9 |
|---|---|---|---|---|
| k = | -4.88190E+00 | -6.21635E-02 | -6.47296E+00 | 0.00000E+00 |
| A4 = | 5.55957E-03 | -1.77703E-04 | 4.89451E-04 | -2.39924E-04 |
| A6 = | -1.70006E-04 | 5.74667E-05 | -6.82502E-05 | -4.00015E-05 |
| A8 = | -2.80260E-07 | -1.79532E-06 | 4.86481E-06 | 8.45678E-06 |
| A10 = | 5.95067E-08 | -2.35214E-08 | -1.27193E-07 | -3.57163E-07 |
| A12 = | 8.03698E-10 | 9.17616E-10 | -1.39171E-10 | 4.11958E-09 |
| A14 = | -2.75082E-11 | 1.72455E-12 | | |

FIG. 13

Table 7
(Embodiment 4)
f = 4.90 mm, f/EPD = 1.30, HFOV = 40.2 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | -70.45808 (ASP) | 2.726 | Plastic | APEL-5514ML | 1.536 | -24.35 |
| 2 | | 16.22272 (ASP) | 2.977 | | | | |
| 3 | Apc. Stop | Plano | 1.025 | | | | |
| 4 | Lens 2 | -8.41173 (ASP) | 2.406 | Plastic | ZEONEX E48R | 1.523 | 8.37 |
| 5 | | -3.16036 (ASP) | 1.366 | | | | |
| 6 | Lens 3 | -2.55233 (ASP) | 2.429 | Plastic | ZEONEX E48R | 1.523 | -11.65 |
| 7 | | -5.83111 (ASP) | 0.070 | | | | |
| 8 | Lens 4 | 3.29649 (ASP) | 2.700 | Plastic | APEL-5514ML | 1.536 | 6.69 |
| 9 | | 29.43555 (ASP) | 2.500 | | | | |
| 10 | IR-filter | Plano | 0.700 | Glass | BSC7 | 1.517 | - |
| 11 | | Plano | 2.076 | | | | |
| 12 | Image | Plano | - | | | | |

Note: Reference wavelength is 850.0 nm. ASP stands for aspherical surfaces.

FIG. 14

Table 8
(Aspheric Coefficients)

| Surface # | 1 | 2 | 4 | 5 |
|---|---|---|---|---|
| k = | 5.75877E+01 | -2.00000E+00 | 1.38462E+00 | -9.55466E-01 |
| A4 = | 3.08061E-03 | 5.55086E-03 | -3.58891E-03 | 4.70758E-03 |
| A6 = | -1.08219E-04 | -1.58048E-04 | -8.55833E-04 | -3.00220E-04 |
| A8 = | 4.13683E-06 | 5.86015E-06 | 3.92869E-04 | 1.96246E-05 |
| A10 = | -9.31156E-08 | 1.40371E-07 | -8.54152E-05 | -2.17789E-06 |
| A12 = | 1.06164E-09 | | 5.07794E-06 | 1.49559E-08 |
| A14 = | | | | -2.20772E-09 |

| Surface # | 6 | 7 | 8 | 9 |
|---|---|---|---|---|
| k = | -4.77897E+00 | -3.01708E-02 | -4.03768E+00 | -6.71624E+00 |
| A4 = | 5.34239E-03 | -7.65484E-04 | 1.32898E-03 | 8.05307E-04 |
| A6 = | -1.81093E-04 | 7.80620E-05 | -5.24248E-05 | -2.88507E-05 |
| A8 = | 2.57890E-07 | -1.07480E-06 | 4.67478E-06 | 7.45891E-06 |
| A10 = | 6.55885E-08 | -6.96949E-10 | -1.63569E-07 | -3.68104E-07 |
| A12 = | -2.42762E-10 | 1.00855E-09 | 1.55828E-09 | 4.84241E-09 |
| A14 = | -2.76580E-11 | -3.55514E-11 | | |

FIG. 15

Table 9
(Embodiment 5)
f = 4.65 mm, f/EPD = 1.30, HFOV = 38.4 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | 36.01027 (ASP) | 1.256 | Plastic | PC | 1.583 | 57.14 |
| 2 | | -442.77304 (ASP) | 2.200 | | | | |
| 3 | Ape. Stop | Plano | 0.619 | | | | |
| 4 | Lens 2 | -7.31840 (ASP) | 1.607 | Plastic | OKP4HT | 1.633 | 13.52 |
| 5 | | -4.28026 (ASP) | 0.966 | | | | |
| 6 | Lens 3 | -2.27698 (ASP) | 1.963 | Plastic | ZEONEX F52R | 1.535 | -33.63 |
| 7 | | -3.39034 (ASP) | 0.070 | | | | |
| 8 | Lens 4 | 3.02358 (ASP) | 3.000 | Plastic | PC | 1.583 | 6.35 |
| 9 | | 10.44504 (ASP) | 1.500 | | | | |
| 10 | IR-filter | Plano | 0.700 | Glass | BSC7 | 1.517 | - |
| 11 | | Plano | 0.840 | | | | |
| 12 | Image | Plano | - | | | | |

Note: Reference wavelength is 587.6 nm. ASP stands for aspherical surfaces.

FIG. 16

Table 10
(Aspheric Coefficients)

| Surface # | 1 | 2 | 4 | 5 |
|---|---|---|---|---|
| k = | 0.000000E+00 | 9.90000E+01 | 0.000000E+00 | -1.88230E+00 |
| A4 = | 4.70812E-03 | 5.96758E-03 | -3.53699E-03 | 4.73095E-03 |
| A6 = | -1.04150E-04 | -1.01174E-04 | -1.22509E-03 | -2.38952E-05 |
| A8 = | 6.66946E-06 | -7.21098E-06 | 2.77873E-04 | 1.38334E-05 |
| A10 = | -7.68909E-08 | 2.21338E-07 | -1.05085E-04 | -6.50213E-06 |
| A12 = | -2.90837E-11 | | 7.37000E-06 | -8.14598E-07 |
| A14 = | | | | 7.27125E-08 |

| Surface # | 6 | 7 | 8 | 9 |
|---|---|---|---|---|
| k = | -4.29472E+00 | -1.09647E+00 | -3.42953E+00 | 0.000000E+00 |
| A4 = | 6.39782E-03 | -1.96447E-03 | 3.19764E-03 | -1.02005E-03 |
| A6 = | -1.43620E-04 | -6.33508E-05 | -2.97358E-04 | -2.35331E-05 |
| A8 = | -2.15187E-06 | -2.10975E-06 | 1.83469E-05 | 2.59460E-06 |
| A10 = | -3.54963E-08 | 1.18177E-07 | -6.44694E-07 | -1.44779E-07 |
| A12 = | -5.11289E-09 | 2.67686E-08 | 8.06687E-09 | 1.67333E-09 |
| A14 = | 1.58326E-09 | 3.02546E-09 | | |

FIG. 17

Table 11
(Embodiment 6)
f = 5.44 mm, f/EPD = 1.20, HFOV = 42.0 deg.

| Surface # | | Curvature Radius | Thickness | Material | | Index | Focal length |
|---|---|---|---|---|---|---|---|
| 0 | Object | Plano | Infinity | | | | |
| 1 | Lens 1 | -58.06687 (ASP) | 1.207 | Plastic | ZEONEX E48R | 1.530 | -67.66 |
| 2 | | 94.41721 (ASP) | 2.800 | | | | |
| 3 | Ape. Stop | Plano | 0.948 | | | | |
| 4 | Lens 2 | -11.60088 (ASP) | 2.249 | Plastic | MGC EP5000 | 1.634 | 15.87 |
| 5 | | -5.79325 (ASP) | 1.263 | | | | |
| 6 | Lens 3 | -3.76898 (ASP) | 2.716 | Plastic | ZEONEX E48R | 1.530 | -14.98 |
| 7 | | -8.96699 (ASP) | 0.080 | | | | |
| 8 | Lens 4 | 4.38120 (ASP) | 2.800 | Plastic | MGC EP5000 | 1.634 | 6.15 |
| 9 | | -26.45650 (ASP) | 2.500 | | | | |
| 10 | IR-filter | Plano | 0.700 | Glass | BSC7 | 1.517 | - |
| 11 | | Plano | 2.471 | | | | |
| 12 | Image | Plano | - | | | | |

Note: Reference wavelength is 587.6nm. ASP stands for aspherical surfaces.
Effective radius of the surface #9 is 5.60mm.

FIG. 18

Table 12
(Aspheric Coefficients)

| Surface # | 1 | 2 | 4 | 5 |
|---|---|---|---|---|
| k = | -9.89986E+01 | -1.86798E+00 | -1.28207E+01 | -1.24509E+00 |
| A4 = | 3.34746E-03 | 2.93519E-03 | -2.27336E-03 | 3.33274E-03 |
| A6 = | -7.11940E-05 | 1.20240E-04 | -4.36971E-04 | -2.29350E-04 |
| A8 = | 2.27219E-06 | -1.46505E-05 | 1.16133E-04 | 1.90719E-05 |
| A10 = | -4.51431E-08 | 5.24988E-07 | -1.64164E-05 | -3.57278E-07 |
| A12 = | 5.71121E-10 | -7.18776E-09 | 2.48934E-07 | -1.11247E-07 |
| A14 = |  |  |  | 4.80836E-09 |

| Surface # | 6 | 7 | 8 | 9 |
|---|---|---|---|---|
| k = | -5.93223E+00 | 1.91718E+00 | -5.77576E+00 | -9.74427E+01 |
| A4 = | 3.40535E-03 | -1.72878E-03 | 2.44144E-03 | 2.99791E-03 |
| A6 = | -1.32456E-04 | 2.92957E-05 | -6.79927E-05 | -1.01014E-04 |
| A8 = | 9.86281E-07 | -1.57054E-06 | 1.800007E-06 | 8.34167E-06 |
| A10 = | 6.97939E-08 | 2.09954E-08 | 8.79884E-09 | -3.38890E-07 |
| A12 = | 5.98269E-10 | 1.93909E-09 | -1.27890E-09 | 3.89453E-09 |
| A14 = | -1.05639E-10 | -7.86511E-13 |  |  |

FIG. 19

Table 13

| | Embodiment 1 | Embodiment 2 | Embodiment 3 | Embodiment 4 | Embodiment 5 | Embodiment 6 |
|---|---|---|---|---|---|---|
| f | 5.08 | 4.68 | 4.84 | 4.90 | 4.65 | 5.44 |
| f/EPD | 0.97 | 0.95 | 0.97 | 1.30 | 1.30 | 1.20 |
| HFOV | 44.6 | 40.8 | 40.2 | 40.2 | 38.4 | 42.0 |
| CT3/CT4 | 0.74 | 1.00 | 1.05 | 0.90 | 0.65 | 0.97 |
| ET3/CT3 | 0.17 | 0.36 | 0.34 | 0.32 | 0.30 | 0.45 |
| T34/T12 | 0.02 | 0.06 | 0.02 | 0.02 | 0.02 | 0.02 |
| R5/R6 | 0.25 | 0.36 | 0.38 | 0.44 | 0.67 | 0.42 |
| f/f1 | −0.29 | −0.28 | −0.26 | −0.20 | 0.08 | −0.08 |
| f/f2 | 0.62 | 0.63 | 0.67 | 0.59 | 0.34 | 0.34 |
| DS1/DS2 | 2.46 | 3.20 | 2.63 | 2.90 | 3.56 | 2.95 |
| Yf/Yr | 0.97 | 0.97 | 1.10 | 1.12 | 0.83 | 0.92 |
| SL/TTL | 0.79 | 0.78 | 0.76 | 0.73 | 0.76 | 0.79 |
| TTL/ImgH | 4.85 | 4.92 | 4.95 | 4.55 | 3.48 | 3.78 |

Note: Reference wavelength of Embodiment 1~4 is 850.0nm.
Reference wavelength for Embodiment 5~6 is 587.6nm.

FIG. 20

OPTICAL LENS ASSEMBLY FOR IMAGE TAKING

BACKGROUND OF THE INVENTION

1. Field of the Invention

The present invention relates to an optical lens assembly for image taking, and more particularly to an optical lens assembly that provides a wide-angle view by four lens elements and the optical lens assembly can be applied to infrared band of electronic products.

2. Description of the Related Art

In recent years, vehicle mount cameras or surveillance cameras have an increasingly demand, and the vehicle mount cameras are generally used for photographing omnimax road conditions or recording a scene before or after a motor vehicle, and the main requirements include a wide angle and a capability of recording images of infrared bands, such that images with a larger width or from a dark environment can be captured by an optical lens. Other applications such as surveillance systems of roads or buildings also require an optical lens with a greater field angle and a capability of taking images formed by light of regular band and/or infrared band. In popular interactive electronic games, a near-infrared image taking method is generally used for detecting a current motion of players to achieve an interactive entertainment effect between the players and the games, and thus there is an urgent need for an optical lens capable of taking an image within the infrared band.

Many different designs are available for the optical lens assembly having a wide-angle optical lens with a fixed focal length. As science and technology advance, the development of electronic products such as digital cameras, web cameras and mobile phone cameras tends to have a compact design to meet the user requirements for an optical lens assembly with the features of low cost, good aberration correction ability, high resolution, and high image quality.

In general, conventional wide-angle optical lens assemblies come with different designs, including the two-lens, three-lens, four-lens, and five-or-more lens designs. As disclosed in U.S. Pat. Publication Nos. 2009/080089, 2010/157443, and 2010/231686, a 3-lens design was adopted; as disclosed in European Pat. No. 2056151, a 4-lens design was adopted, and as disclosed in WIPO Pat. Publication No. 2010007845 and U.S. Pat. No. 7,768,719, a 5-lens design was adopted. If the image quality is taken into consideration, the optical lens assemblies with the four-lens and five-lens designs have advantages on aberration correction and distortion correction caused by the wide angle, and the four-lens design contains less lenses than the five-lens design, and thus incurring a lower cost, so that the 4-lens design can be adopted in the wide-angle optical lens having a good image quality.

In various designs of the four-lens optical lens assembly having a greater field angle, the prior art adopts different combination of positive and/or negative refractive powers, wherein a design having the first lens element with negative refractive power, the second lens element with positive refractive power, the third lens element with positive refractive power, and the fourth lens element with negative refractive power was disclosed in U.S. Pat. No. 6,043,941; a design having the first lens element with positive refractive power, the second lens element with negative refractive power, the third lens element with positive refractive power, and the fourth lens element with positive refractive power was disclosed in U.S. Pat. Publication No. 2003/161054; and a design having the first lens element with negative refractive power, the second lens element with negative refractive power, the third lens element with positive refractive power and the fourth lens element with positive refractive power was disclosed in European Pat. No. 2009476.

In the design with a greater field angle, a greater image aberration occurs at off-axis and close to edges of an image. To achieve the requirement for a high quality of the optical lens assembly, a better design should be provided for compensating the image aberration. To use in small optical lenses, the increasing of the field angle is not to sacrifice the optical effective radius. To meet the all-weather image taking requirement, the optical lens assembly should still provide a good aberration correction for images within the infrared band. Therefore, the present invention provides a practical and feasible design that uses a combination of different refractive indexes, concave optical sides and convex optical sides of the four lenses to enhance the field angle, and provides a good aberration correction within visible and infrared bands, so that the optical lens assembly can be applied to infrared image taking optical lens of electronic products and interactive electronic games.

SUMMARY OF THE INVENTION

Therefore, it is a primary objective of the invention to provide an optical lens assembly for image taking, sequentially arranged from an object side to an image side along an optical axis, comprising: the first lens element, the second lens element, the third lens element, and the fourth lens element, wherein the first lens element has positive or negative refractive power; the second lens element has positive refractive power; the third lens element with negative refractive power has a concave object-side surface, a convex image-side surface, and at least one of the object-side surface and image-side surface of the third lens element is aspheric; the fourth lens element with positive refractive power has a convex object-side surface, and at least one of its object-side surface and image-side surface is aspheric; and the optical lens assembly satisfies the following conditions:

$$0.5 < CT_3/CT_4 < 1.5; \text{ and} \tag{1}$$

$$f/EPD < 1.8 \tag{2}$$

Wherein, $CT_3$ is a thickness of the third lens element near the optical axis, $CT_4$ is a thickness of the fourth lens element near the optical axis, f is a focal length of the optical lens assembly for image taking, and EPD is an entrance pupil diameter of the optical lens assembly for image taking.

The optical lens assembly for image taking further comprises a stop that satisfies the following condition:

$$0.65 < SL/TTL < 0.85 \tag{3}$$

Wherein, SL is an axial distance from the stop to the image plane of the optical lens assembly, and TTL is an axial distance from the object-side surface of the first lens element to the image plane.

The optical lens assembly for image taking in accordance with the present invention further comprises an image sensor at the image plane for imaging an object, wherein the image sensor may be but not limited to a charge coupled device (CCD) sensor, a complementary metal oxide semiconductor (CMOS) sensor or a light sensing film, and satisfies the following condition:

$$TTL/ImgH < 8.0 \tag{4}$$

Wherein, TTL is the axial distance from the object-side surface of the first lens element to the image plane, and ImgH is half of the diagonal length of an effective photosensitive area of the image sensor.

The present invention further provides an optical lens assembly for image taking, as in the aforesaid, wherein the first lens element with negative refractive power has a convex object-side surface and a concave image-side surface, and at least one of the object-side surface and image-side surface of the third lens element has at least one inflection point; and the third lens element and the fourth lens element are made of plastic material, and one or more of the following conditions are satisfied:

$$\text{Preferably}, f/EPD<1.4 \quad (5)$$

$$\text{Further}, f/EPD<1.2 \quad (14)$$

$$0.1<R_5/R_6<0.8 \quad (6)$$

$$\text{Preferably}, 0.7<CT_3/CT_4<1.2 \quad (7)$$

$$2.0<DS_1/DS_2<4.0 \quad (8)$$

$$0.2<f/f_2<1.0 \quad (9)$$

$$-0.5<f_1/f_1<0.2 \quad (10)$$

Wherein, f is a focal length of the optical lens assembly for image taking, EPD is an entrance pupil diameter of the optical lens assembly for image taking, $R_5$ is a curvature radius of the object-side surface of the third lens element, $R_6$ is a curvature radius of the image-side surface of the third lens element, $CT_3$ is a thickness of the third lens element near the optical axis, $CT_4$ is a thickness of the fourth lens element near the optical axis, $DS_1$ is a distance from the nearest lens surface of the object side of the stop to the stop along the optical axis, such as the distance from the image-side surface of the first lens element to the stop along the optical axis, $DS_2$ is a distance from the nearest lens surface of the image side of the stop to the stop along the optical axis, such as the distance from the stop to the object-side surface of the second lens element along the optical axis, $f_2$ is a focal length of the second lens element, and $f_1$ is a focal length of the first lens element.

The present invention further provides an optical lens assembly for image taking, sequentially arranged from an object side to an image side along an optical axis, comprising: the first lens element, the second lens element, the third lens element, and the fourth lens element, and the optical lens assembly for image taking further comprises a stop and an image sensor at an image plane, wherein the first lens element has positive or negative refractive power; the second lens element has positive refractive power; the third lens element with negative refractive power, and being made of a plastic material has a concave object-side surface and a convex image-side surface, and at least one of the object-side surface and image-side surface of the third lens element being aspheric, and at least one of its object-side surface and image-side surface has at least one inflection point; the fourth lens element with positive refractive power and being made of plastic has a convex object-side surface, and at least one of its \object-side surface and image-side surface being aspheric; and the optical lens assembly for image taking satisfies one or more of the following conditions, in addition to conditions (1), (2), (3) and (4):

$$\text{Preferably}, f/EPD<1.4 \quad (5)$$

$$\text{Further}, f/EPD<1.2 \quad (14)$$

$$0.05<ET_3/CT_3<0.60 \quad (11)$$

$$0.75<Y_f/Y_r<1.30 \quad (12)$$

$$0<T_{34}/T_{12}<0.1 \quad (13)$$

Wherein, f is a focal length of the optical lens assembly for image taking, EPD is an entrance pupil diameter of the optical lens assembly for image taking, $CT_3$ is a thickness of the third lens element near the optical axis, $ET_3$ is an edge thickness at the optical maximum effective radius of the third lens element; $Y_f$ is the optical maximum effective radius of the object-side surface of the lens element closest to the object side of the optical lens assembly for image taking, $Y_r$ is the optical maximum effective radius of the image-side surface of the lens element closest to the image side of the optical lens assembly for image taking closest to the image plane; $T_{12}$ is an axial distance between the first lens element and the second lens element, $T_{34}$ is an axial distance between the third lens element and the fourth lens element.

Another objective of the present invention is to provide an optical lens assembly for image taking, sequentially arranged from an object side to an image side along an optical axis, comprising: the first lens element, the second lens element, the third lens element, the fourth lens element, wherein the first lens element has negative refractive power; the second lens element with positive refractive power has a convex image-side surface; the third lens element with negative refractive power has a concave object-side surface and a convex image-side surface, and at least one of the object-side surface and image-side surface of the third lens element being aspheric; the fourth lens element with positive refractive power has a convex object-side surface, and at least one of the object-side surface and an image-side surface of the fourth lens element being aspheric; and the optical lens assembly for image taking further comprises an stop and satisfies the following conditions:

$$0.5<CT_3/CT_4<1.5 \quad (1)$$

$$0.2<f/f_2<1.0 \quad (9)$$

$$0.65<SL/TTL<0.85 \quad (3)$$

Wherein, $CT_3$ is a thickness of the third lens element near the optical axis, $CT_4$ is a thickness of the fourth lens element near the optical axis, f is a focal length of the optical lens assembly for image taking, $f_2$ is a focal length of the second lens element, SL is an axial distance from the stop to the image plane of the optical lens assembly, and TTL is an axial distance from the object-side surface of the first lens element to the image plane.

The present invention further provides an optical lens assembly for image taking, as in the aforesaid, wherein the second lens element has a concave object-side surface, and the fourth lens element is made of a plastic material, and the optical lens assembly for image taking satisfies one or more of the following conditions:

$$0.1<R_5/R_6<0.8 \quad (6)$$

$$-0.5<f/f_1<0.2 \quad (10)$$

$$\text{Preferably}, 0.3<f/f_2<0.8 \quad (15)$$

$$0.75<Y_f/Y_r<1.30 \quad (12)$$

$$0.05<ET_3/CT_3<0.60 \quad (11)$$

$$f/EPD<1.8 \quad (2)$$

$$0<T_{34}/T_{12}<0.1 \quad (13)$$

Wherein, $R_5$ is a curvature radius of the object-side surface of the third lens element, $R_6$ is a curvature radius of the image-side surface of the third lens element, f is a focal length of the optical lens assembly for image taking, EPD is an entrance pupil diameter of the optical lens assembly for image taking, $f_1$ is a focal length of the first lens element, $f_2$ is a focal length of the second lens element, $Y_f$ is the optical maximum effective radius of the object-side surface of the lens element closest to the object side of the optical lens assembly for image taking, $Y_r$ is the optical maximum effective radius of the image-side surface of the lens element closest to the image side of the optical lens assembly for image taking closest to the image plane, $CT_3$ is a thickness of the third lens element near the optical axis, $ET_3$ is an edge thickness at the optical maximum effective radius of the third lens element; $T_{12}$ is an axial distance between the first lens element and the second lens element, and $T_{34}$ is an axial distance between the third lens element and the fourth lens element.

With appropriate gaps among the first lens element, the second lens element, the third lens element and the fourth lens element along the optical axis of the present invention, a good aberration correction and a better modulation transfer function (MTF) in a greater field angle can be achieved.

In the optical lens assembly for image taking of the present invention, the first lens element and the second lens element are the lens with refractive power, such that their combination can increase the field angle; the third lens element is the lens with negative refractive power, such that the image aberration produced by the first lens element and the second lens element can be corrected, and the distortion at the periphery of the image can be reduced, while the capability of correcting aberrations in infrared bands is available for improving the resolution of the optical lens assembly for image taking, and the fourth lens element comes with positive refractive power for further enhancing the refractive power and adapting the modulation transfer function, such that the aberration and distortion of the optical lens assembly for image taking can be corrected to meet the high resolution requirement.

In the optical lens assembly for image taking of the present invention, the stop can be arranged behind the first lens element of the optical lens assembly and in front of the second lens element with positive refractive power, and such arrangement will give a longer distance between the exit pupil of the optical lens assembly and the image plane of the optical lens assembly, and a larger entrance pupil can be set, and images can be received by the image sensor through a direct incidence method. In addition to avoiding dark corners, the telecentric effect at the image plane can be achieved. In general, the telecentric effect can improve the brightness of the image plane to increase the efficiency for the CCD or CMOS image sensor to receive images.

If the object-side surface of the third lens element has an inflection point, the angle of the light exiting from the edge of the third lens element can be guided, such that the light of the image of the off-axis field can be guided at an angle towards the image sensor and received by the image sensor.

In the optical lens assembly for image taking of the present invention, the entrance pupil diameter and the exit pupil diameter of the optical lens assembly can be limited to a range with an acceptable difference, so that the field angle of the optical lens assembly can be increased, and the total length of the optical lens assembly for image taking can be shortened, and the optical effective area of the optical lens assembly is lessened, where the diameter of the optical lens assembly can thus be minimized to fit small sized electronic products. In addition, the third lens element has a concave object-side surface and a convex image-side surface, which joins the fourth lens element with a convex object-side surface to effectively correct the astigmatism. In addition, the third lens element and the fourth lens element are made of plastic in simple shape, which substantially favors the manufacture and lowers the cost.

BRIEF DESCRIPTION OF THE DRAWINGS

FIG. 8 shows Table 1 that lists optical data of the first preferred embodiment of the present invention;

FIG. 9 shows Table 2 that lists aspherical surface data of the first preferred embodiment of the present invention;

FIG. 10 shows Table 3 that lists optical data of the second preferred embodiment of the present invention;

FIG. 11 shows Table 4 that lists aspherical surface data of the second preferred embodiment of the present invention;

FIG. 12 shows Table 5 that lists optical data of the third preferred embodiment of the present invention;

FIG. 13 shows Table 6 that lists aspherical surface data of the third preferred embodiment of the present invention;

FIG. 14 shows Table 7 that lists optical data of the fourth embodiment of the present invention;

FIG. 15 shows Table 8 that lists aspherical surface data of the fourth preferred embodiment of the present invention;

FIG. 16 shows Table 9 that lists optical data of the fifth embodiment of the present invention;

FIG. 17 shows Table 10 that lists aspherical surface data of the fifth preferred embodiment of the present invention;

FIG. 18 shows Table 11 that lists optical data of the sixth embodiment of the present invention;

FIG. 19 shows Table 12 that lists aspherical surface data of the sixth preferred embodiment of the present invention; and FIG. 20 shows Table 13 that lists data of related equations of the first to sixth preferred embodiments of the present invention.

DETAILED DESCRIPTION OF THE PREFERRED EMBODIMENTS

Figure 1A:
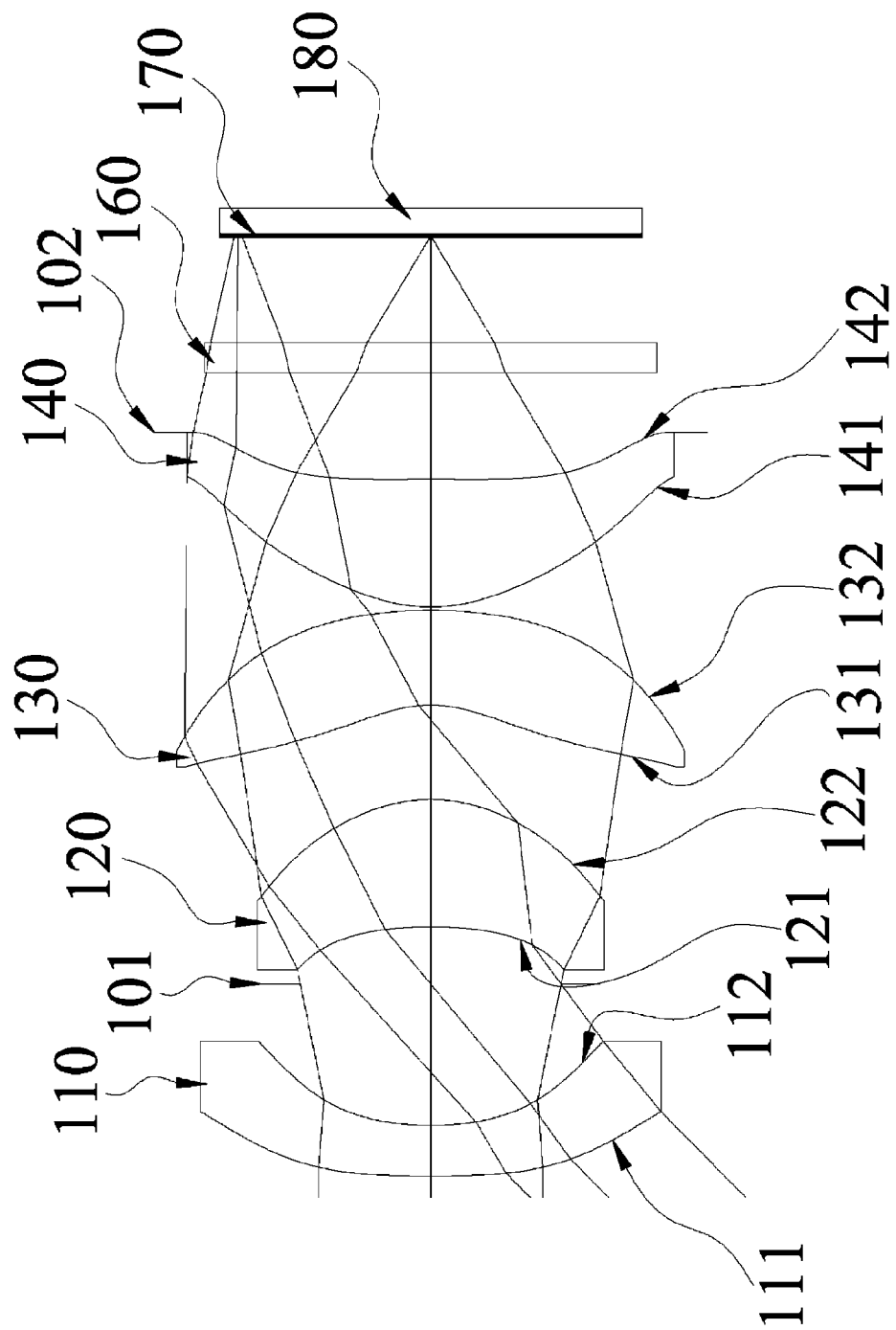
FIG. 1A is a schematic view of an optical lens assembly in accordance with the first preferred embodiment of the present invention.

With reference to FIG. 1A for an optical lens assembly for image taking in accordance with the present invention, the optical lens assembly for image taking, sequentially arranged from an object side to an image side along an optical axis, comprises: the first lens element (110), an aperture stop (101), the second lens element (120), the third lens element (130), the fourth lens element (140), a stop (102), a filter (160) and an image sensor (180), wherein the first lens element (110) has negative refractive power, and its object-side surface (111) and image-side surface (112) can be spheric or aspheric; the second lens element (120) with positive refractive power has a concave object-side surface (121) and a convex image-side surface (122), and the object-side surface (121) and the image-side surface (122) can be spheric or aspheric; the third lens element (130) with negative refractive power has a concave object-side surface (131) and a convex image-side surface (132), and at least one of the object-side surface (131) and the image-side surface (132) of the third lens element (130) is aspheric; the fourth lens element (140) with positive refractive power has a convex object-side surface (141) and a convex image-side surface (142); the image sensor (180) is installed right at an image plane (170) for imaging an object; where the stop (102) is installed between the image-side surface (142) of the fourth lens element (140) and the image plane (170) for reducing stray light to enhance image quality. The aspheric surfaces of the first lens element (110), the second lens element (120), the third lens element (130) and the fourth lens element (140) are in compliance with an aspherical surface formula in Equation (16):

$$X(Y) = \frac{(Y^2/R)}{1+\sqrt{(1-(1+K)(Y/R)^2)}} + \sum_i (A_i) \cdot (Y^i) \quad (16)$$

Wherein,

X is the relative height from a point on the aspherical surface with a distance Y from the optical axis to a tangent plane at the tip of the optical axis of the aspherical surface;

Y is the distance between a point on the curve of the aspherical surface and the optical axis;

K is the conic coefficient; and $A_i$ is the $i^{th}$ level aspherical surface coefficient.

In the optical lens assembly for image taking of the present invention, the first lens element (110), second lens element (120), third lens element (130) and fourth lens element (140) can be made of glass or plastic, and the optical surface can be spheric or aspheric. If the aspheric surfaces are adopted, the curvature radius of the optical surface can be used for changing its refractive power to eliminate or reduce aberration, further to decrease the number of lenses used in the optical lens assembly, and eventually to shorten the total length of the optical lens assembly. Therefore, the optical lens assembly for image taking of the present invention comprises the first lens element (110), second lens element (120), third lens element (130), fourth lens element (140), aperture stop (101) and image sensor (180) can satisfy the first group of equations including Equation (1), Equation (2), and Equation (3). If the third lens element (130) is limited, such that at least one of its optical surfaces has at least one inflection point, and the third lens element (130) and fourth lens element (140) are made of plastic, then the change of the surface shape of the third lens element (130) produced by the inflection point can be used for changing the refractive power of the third lens element (130), which further refracts the light of the image of an object, so as to shorten the total length of the optical lens assembly to satisfy the condition of Equation (4).

Figure 7:
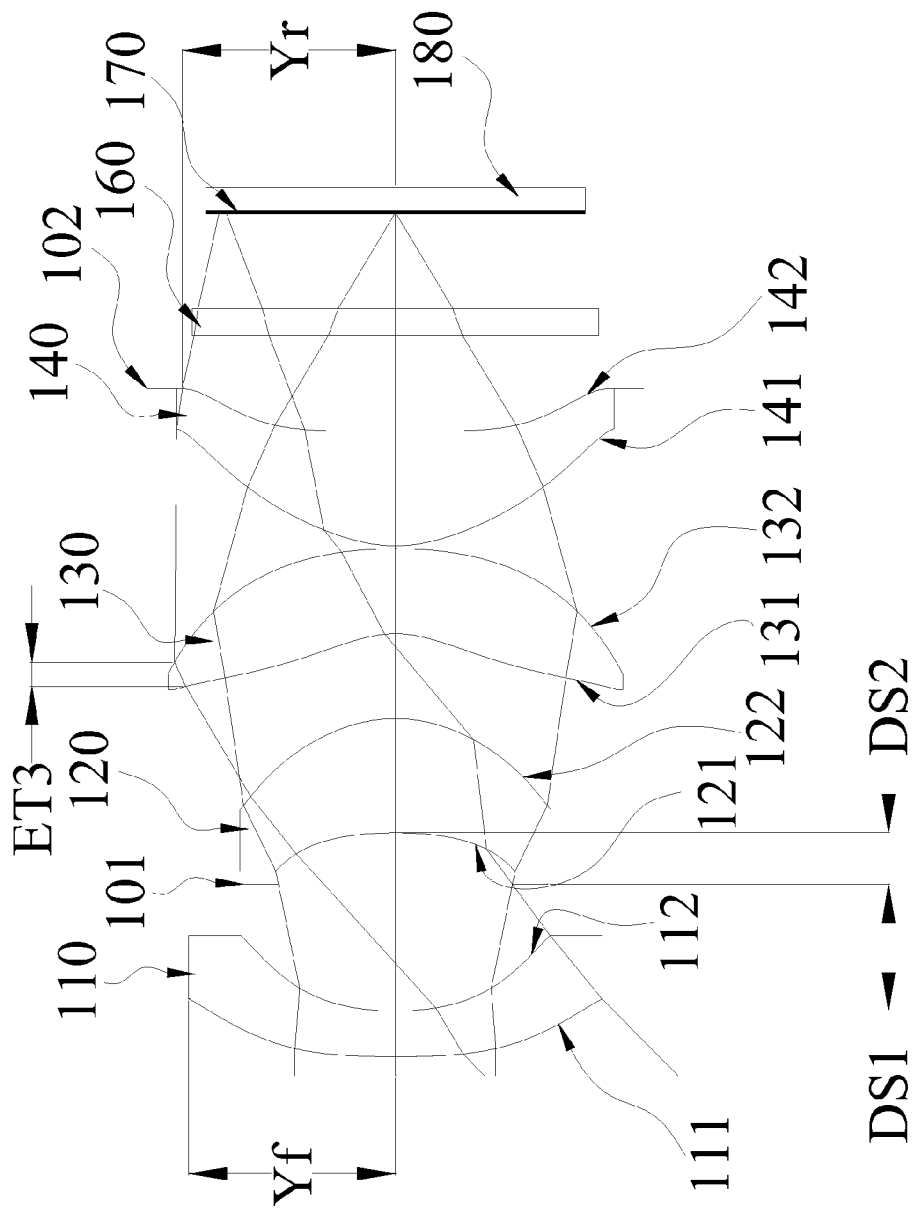
FIG. 7 shows numerals representing respective elements of an optical lens assembly of the present invention.

In the optical lens assembly for image taking in accordance with the present invention, the aperture stop (101) is arranged behind the first lens element (110) and in front of the second lens element (120) with positive refractive power, if the ratio of the focal length f of the optical lens assembly for image taking to the entrance pupil diameter EPD of the optical lens assembly for image taking satisfies Equation (5) or further satisfies Equation (14); if $Y_f$ is the optical maximum effective radius of the object-side surface of the lens element closest to the object side of the optical lens assembly for image taking (as shown in FIG. 7 indicating the optical maximum effective radius of the object-side surface (111) of the first lens element (110), and the same applies to the following preferred embodiments, and thus they will not be described in details again), and $Y_r$ is the optical maximum effective radius of the image-side surface of the lens element closest to the image side of the optical lens assembly for image taking closest to the image plane (as shown in FIG. 7, indicating the optical maximum effective radius of the image-side surface (142) of the fourth lens element (140), and the same applies to the following preferred embodiments, and thus they will not be described in details again) satisfy Equation (12), which can further improve the telecentric effect of the image side and having the aforementioned ratio of the entrance pupil to that of the exit pupil to enhance the telecentric effect. Such arrangement can improve the brightness of the image plane, enhance the efficiency for the image sensor (180) to receive images, restrict the optical effective radius, and fit the design with a smaller diameter. In the optical lens assembly for image taking of the present invention, the stop (102) can be in the form of a glare stop or a field stop, but the invention is not limited to such arrangement only. The stop (102) is provided for reducing stray light, which helps to improve image quality.

If the ratio of the near-axis curvature radius $R_5$ of the object-side surface (131) of the third lens element (130) to the near-axis curvature radius $R_6$ of the image-side surface (132) of the third lens element is limited, the variation of curvature of the object-side surface (131) and the image-side surface (132) of the third lens element (130) will be kept at a moderate value, which lowers the difficulty of cost-saving.

If the ratios of the focal length $f_2$ of the second lens element (120) and of the focal length $f_1$ of the first lens element (110) to the focal length f of the optical lens assembly for image taking respectively satisfy Equation (9) and Equation (10), the refractive power of the first lens element (110) and the second lens element (120) can be arranged to facilitate correcting aberrations and shortening the total length. If one or more of Equations (7), (8), (11) and (13) are limited, where $CT_3$, a thickness of the third lens element (130) near the optical axis, $CT_4$, a thickness of the fourth lens element (140)

near the optical axis, $ET_3$, an edge thickness at the maximum effective radius of the third lens element (130) (as shown in FIG. 7), $T_{34}$, the distance between the third lens element (130) and the fourth lens element (140), $DS_1$, the distance from the nearest lens surface of the object side of the aperture stop (101) to the aperture stop (101) along the optical axis (as shown in FIG. 7, and the distance from the image-side surface (111) of the first lens element (110) to the aperture stop (101) along the optical axis in this preferred embodiment can be applied to the following preferred embodiments, and thus they will not be described again), and $DS_2$, the distance from the nearest lens surface of the image side of the aperture stop (101) to the aperture stop (101) along the optical axis (as shown in FIG. 7, and the distance from the aperture stop (101) to the object-side surface (121) of the second lens element (120) along the optical axis in this preferred embodiment can be applied to the following preferred embodiments, and thus they will not be described again) can be adjusted for their air gaps to fit different applications and to shorten the total length of the optical lens assembly.

The optical lens assembly for image taking in accordance with the present invention is described in details by reference to the following preferred embodiments and related drawings.

First Preferred Embodiment

Figure 1B:
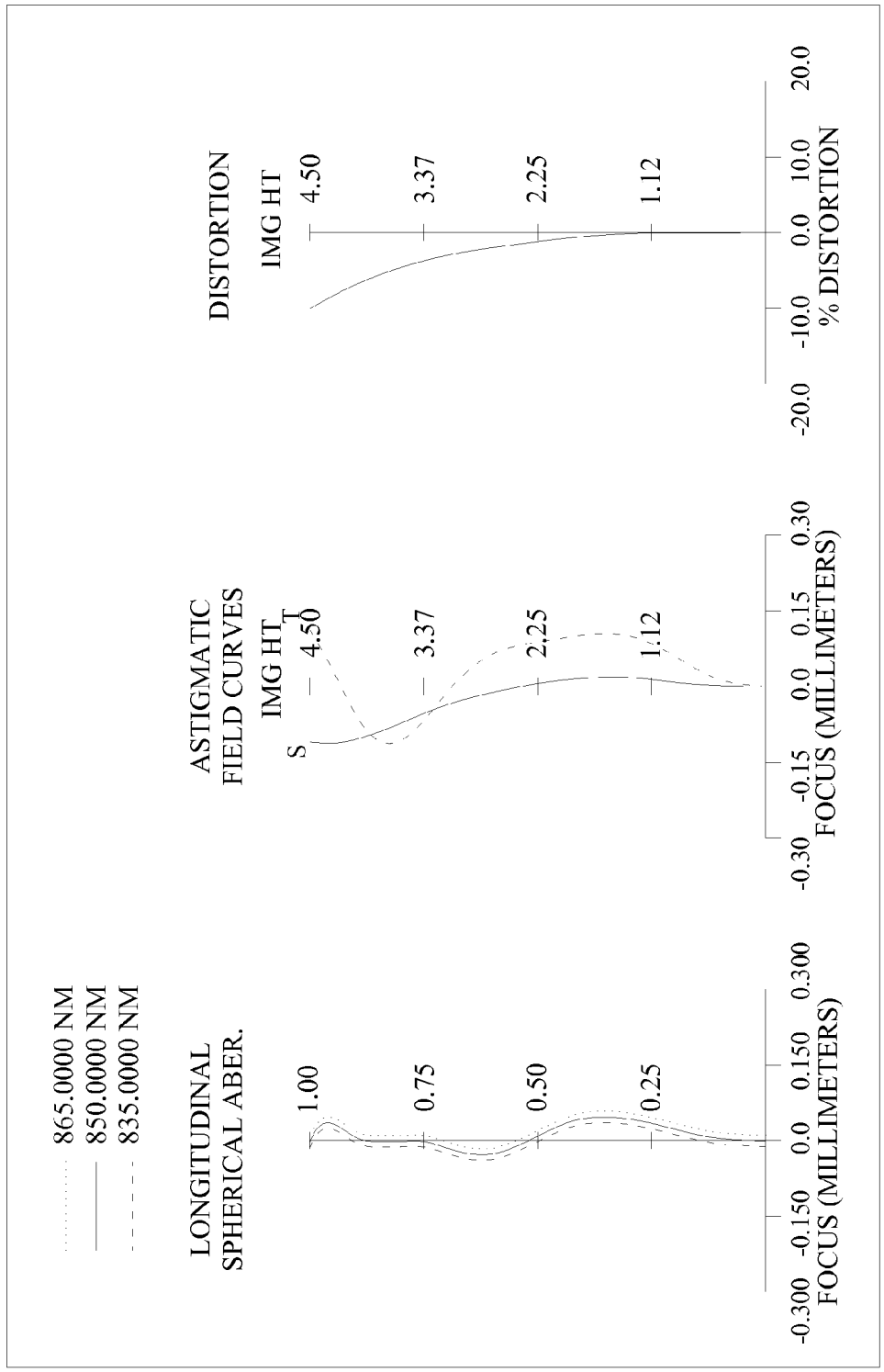
FIG. 1B is a series of aberration curves of an optical lens assembly in accordance with the first preferred embodiment of the present invention.

With reference to FIGS. 1A and 1B for a schematic view and a series of aberration curves of the optical lens assembly for image taking in accordance with the first preferred embodiment of the present invention respectively, the optical lens assembly for image taking of the first preferred embodiment comprises four lens elements, an aperture stop, a field stop, a filter (160) and an image sensor (180). In this preferred embodiment, a good aberration correction effect at the infrared wavelength can be achieved, and this embodiment can be applied for taking images within visible and infrared bands. The optical lens assembly for image taking of this preferred embodiment, sequentially arranged from an object side to an image side along an optical axis comprises: the first lens element (110) with refractive power, being a lens element made of a plastic material, and having a convex object-side surface (111) and a concave image-side surface (112), and both object-side surface (111) and image-side surface (112) being aspheric; an aperture stop (101); the second lens element (120) with positive refractive power, being a lens element made of a plastic material, and having a concave object-side surface (121) and a convex image-side surface (122), and both object-side surface (121) and image-side surface (122) being aspheric; the third lens element (130) with negative refractive power, being a lens element made of a plastic material, and having a concave object-side surface (131) and a convex image-side surface (132), and both object-side surface (131) and image-side surface (132) being aspheric, and the object-side surface (131) having an inflection point; the fourth lens element (140) with positive refractive power, being a lens element made of a plastic material, and having a convex object-side surface (141) and a convex image-side surface (142), and both object-side surface (141) and image-side surface (142) being aspheric, and the image-side surface (142) having an inflection point; a field stop (102); a filter (160) made of a plate glass material for adjusting the range of the wavelength of the imaging light; and an image sensor (180) installed at an image plane (170). The material used for each lens element is listed in FIG. 8 (or Table 1).

With reference to FIG. 8 (or Table 1) for the optical data of this preferred embodiment, the object-side surface (111) and image-side surface (112) of the first lens element (110), the object-side surface (121) and image-side surface (122) of the second lens element (120), the object-side surface (131) and image-side surface (132) of the third lens element (130), and the object-side surface (141) and image-side surface (142) of the fourth lens element (140) satisfy the aspherical surface formula as given in Equation (16), and FIG. 9 (or Table 2) lists the aspherical surface coefficients.

In the optical lens assembly for image taking in accordance with the first preferred embodiment, the focal length of the whole image pickup optical system is f=5.08 (mm), the ratio of the focal length of the whole image pickup optical system to the entrance pupil diameter of the optical lens assembly for image taking is f/EPD=0.97, and half of the maximum view angle is HFOV=44.6 (degrees).

With reference to Table 1 for this preferred embodiment, if $CT_3$ is a thickness of the third lens element (130) near the optical axis of the optical lens assembly, $CT_4$ is a thickness of the fourth lens element (140) near the optical axis, SL is an axial distance from the aperture stop (101) to the image plane (170) of the optical lens assembly, TTL is an axial distance from the object-side surface (111) of the first lens element to the image plane (170), ImgH is half of the diagonal length of the effective photosensitive area of the image sensor (180), $DS_1$ is a distance from the image-side surface (111) of the first lens element (110) to the aperture stop (101) along the optical axis, $DS_2$ is a distance from the aperture stop (101) to the object-side surface (121) of the second lens element (120) along the optical axis, and the relations of $CT_3/CT_4=0.74$, $SL/TTL=0.79$, $TTL/ImgH=4.85$, and $DS_1/DS_2=2.46$ are satisfied.

In this preferred embodiment of the present invention, the optical lens assembly for image taking is applied to an infrared band, with related focal length and refractive index calculated according to the wavelength of 850.0 nm, wherein f is a focal length of the optical lens assembly for image taking, $f_1$ is a focal length of the first lens element (110), $f_2$ is a focal length of the second lens element (120), $R_5$ is a curvature radius of the object-side surface (131) of the third lens element (130), $R_6$ is a curvature radius of the image-side surface (132) of the third lens element (130), and the relations of $f/f_1=-0.29$, $f/f_2=0.62$, and $R_5/R_6=0.25$ are satisfied.

In this preferred embodiment, $CT_3$ is a thickness of the third lens element (130) near the optical axis, $ET_3$ is an edge thickness at the optical maximum effective radius of the third lens element (130), $Y_f$ is the optical maximum effective radius of the object-side surface (111) of the first lens element (110), $Y_r$ is the optical maximum effective radius of the image-side surface (142) of the fourth lens element (140), $T_{12}$ is an axial distance between the first lens element (110) and the second lens element (120), $T_{34}$ is an axial distance between the third lens element (130) and the fourth lens element (140), and the relations of $ET_3/CT_3=0.17$, $T_{34}/T_{12}=0.02$, and $Y_f/Y_r=0.97$ are satisfied. Refer to FIG. 20 (or Table 13) for related data of the aforementioned relations.

From the optical data listed in FIG. 8 (or Table 1) and the aberration curve as shown in FIG. 1B, good compensation effects on longitudinal spherical aberration, astigmatic field curving and distortion can be achieved by the optical lens assembly for image taking image in accordance with this preferred embodiment of the present invention.

Second Preferred Embodiment

Figure 2A:
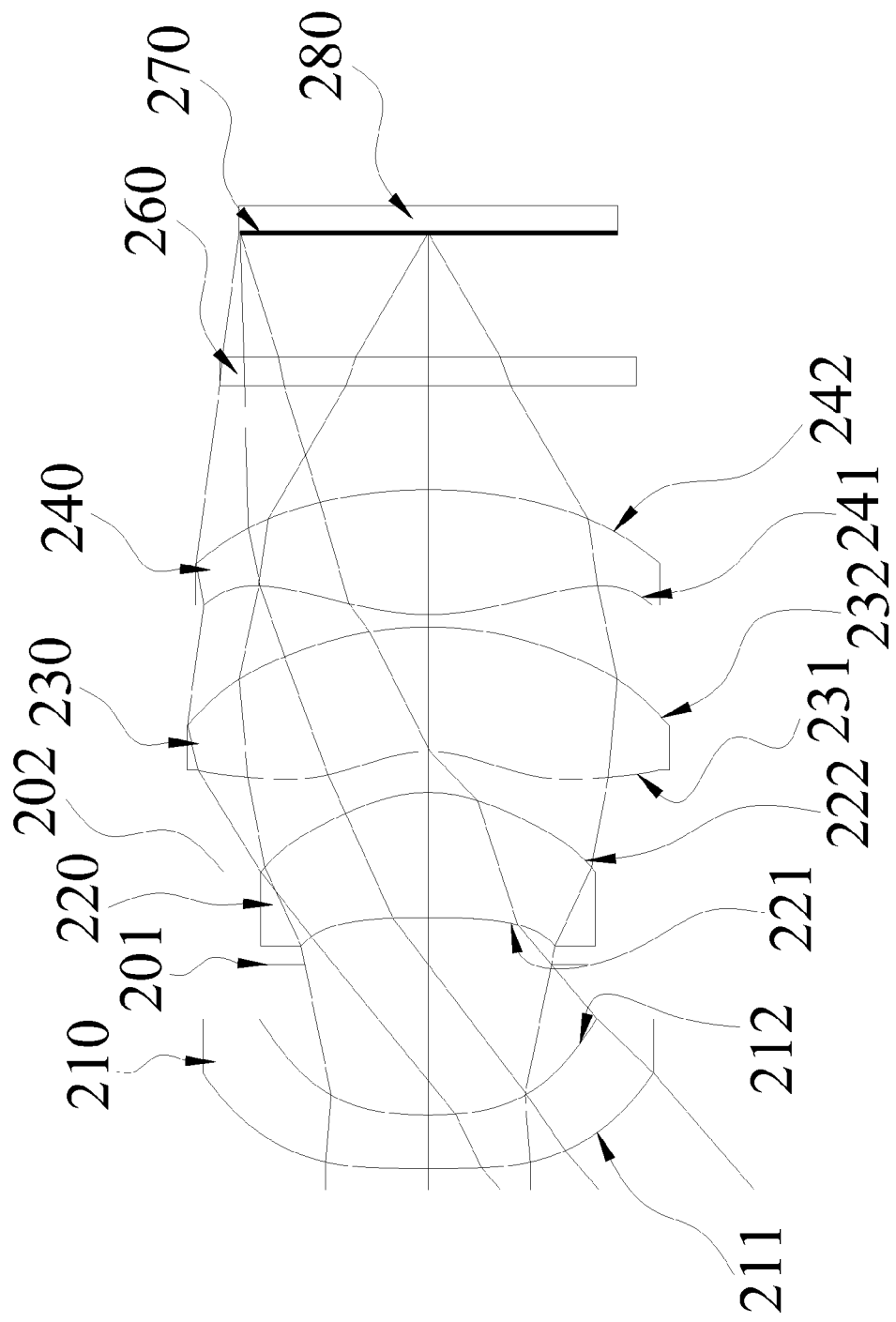
FIG. 2A is a schematic view of an optical lens assembly in accordance with the second preferred embodiment of the present invention.
Figure 2B:
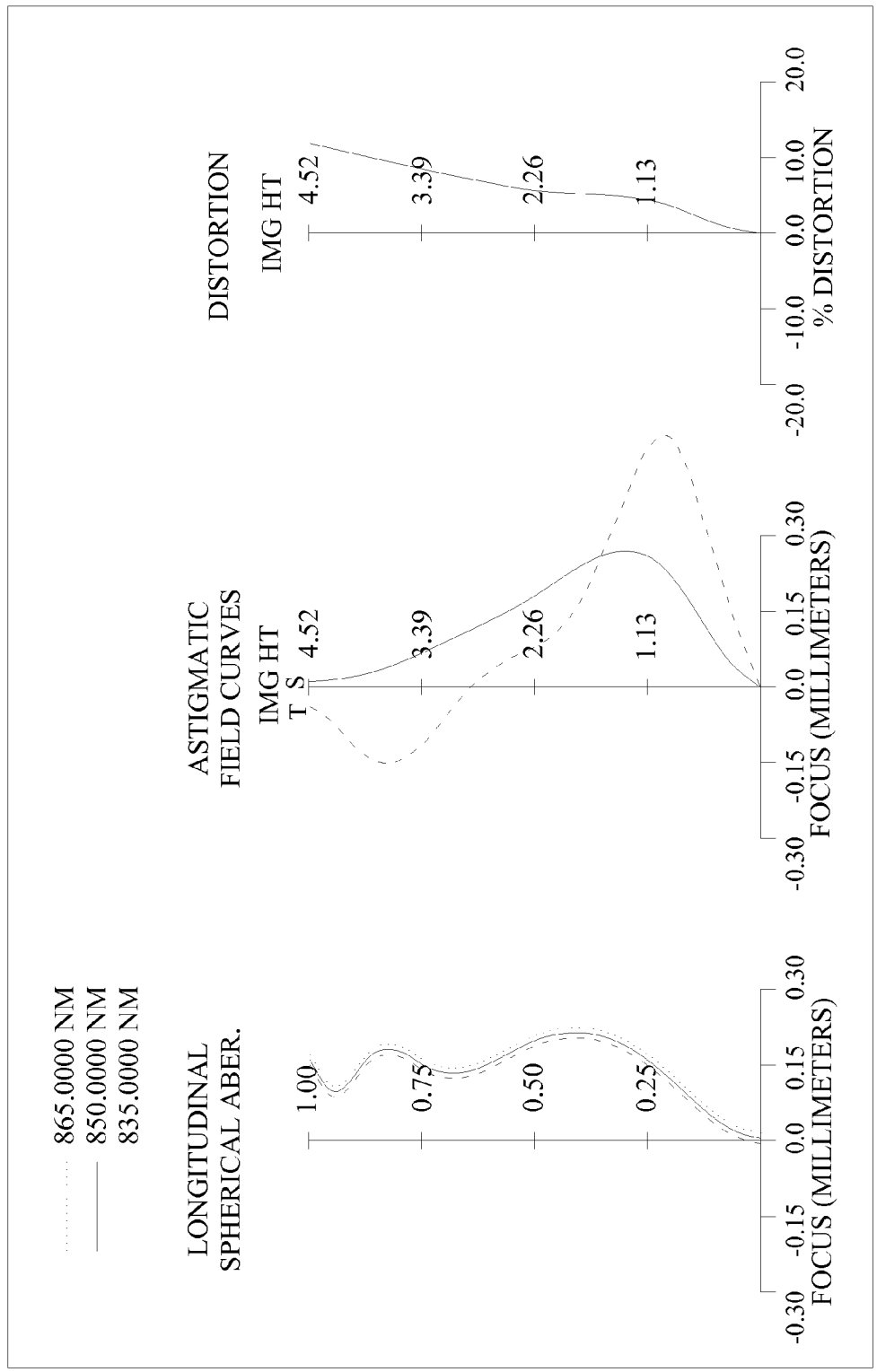
FIG. 2B is a series of aberration curves of an optical lens assembly in accordance with the second preferred embodiment of the present invention.

With reference to FIGS. 2A and 2B for a schematic view and a series of aberration curves of the optical lens assembly for image taking in accordance with the second preferred embodiment of the present invention respectively, the optical lens assembly for image taking of the second preferred embodiment comprises four lens elements, an aperture stop, a field stop, a filter (260) and an image sensor (280). In this preferred embodiment, a good aberration correction effect at the infrared wavelength can be achieved, and this embodiment can be applied for taking images within visible and infrared bands. The optical lens assembly for image taking of this preferred embodiment, sequentially arranged from an object side to an image side along an optical axis comprises: the first lens element (210) with negative refractive power, being a lens element made of a plastic material, and having a convex object-side surface (211) and a convex image-side surface (212), and both object-side surface (211) and image-side surface (212) being aspheric, and an aperture stop (201); the second lens element (220) with positive refractive power, being a lens element made of a plastic material, and having a concave object-side surface (221) and a convex image-side surface (222), and both object-side surface (221) and image-side surface (222) being aspheric; and a field stop (202); the third lens element (230) with negative refractive power, being a lens element made of a plastic material, and having a concave object-side surface (231) and a convex image-side surface (232), and both object-side surface (231) and image-side surface (232) being aspheric, and the object-side surface (231) having an inflection point; the fourth lens element (240) with positive refractive power, being a lens element made of a plastic material, and having a convex object-side surface (241) and a convex image-side surface (242), and both object-side surface (241) and image-side surface (242) being aspheric, and the object-side surface (241) having an inflection point and a field stop (202); a filter (260) made of a plate glass material for adjusting the range of the wavelength of the imaging light; and an image sensor (280) installed at an image plane (270). The material used for each lens element is listed in FIG. 10 (or Table 3).

With reference to FIG. 10 (or Table 3) for the optical data of this preferred embodiment, the object-side surface (211) and image-side surface (212) of the first lens element (210), the object-side surface (221) and image-side surface (222) of the second lens element (220), the object-side surface (231) and image-side surface (232) of the third lens element (230), and the object-side surface (241) and image-side surface (242) of the fourth lens element (240) satisfy the aspherical surface formula as given in Equation (16), and FIG. 11 (or Table 4) lists the aspherical surface coefficients.

In the optical lens assembly for image taking in accordance with the second preferred embodiment, the focal length of the whole image pickup optical system is f=4.68 (mm), the ratio of the focal length of the whole image pickup optical system to the entrance pupil diameter of the optical lens assembly for image taking is f/EPD=0.95, and half of the maximum view angle is HFOV=40.8 (degrees).

With reference to Table 3 for this preferred embodiment, if $CT_3$ is a thickness of the third lens element (230) near the optical axis of the optical lens assembly, $CT_4$ is a thickness of the fourth lens element (240) near the optical axis, SL is an axial distance from the aperture stop (201) to the image plane (270) of the optical lens assembly, TTL is an axial distance from the object-side surface (211) of the first lens element to the image plane (270), ImgH is half of the diagonal length of the effective photosensitive area of the image sensor (280), $DS_1$ is a distance from the image-side surface (211) of the first lens element (210) to the aperture stop (201) along the optical axis, $DS_2$ is a distance from the aperture stop (201) to the object-side surface (221) of the second lens element (220) along the optical axis, and the relations of $CT_3/CT_4=1.00$, SL/TTL=0.78, TTL/ImgH=4.92, and $DS_1/DS_2=3.20$ are satisfied.

In this preferred embodiment of the present invention, the optical lens assembly for image taking is applied to an infrared band, with related focal length and refractive index calculated according to the wavelength of 850.0 nm, wherein f is a focal length of the optical lens assembly for image taking, $f_1$ is a focal length of the first lens element (210), $f_2$ is a focal length of the second lens element (220), $R_5$ is a curvature radius of the object-side surface (231) of the third lens element (230), $R_6$ is a curvature radius of the image-side surface (232) of the third lens element (230), and the relations of $f/f_1=-0.28$, $f/f_2=0.63$, and $R_5/R_6=0.36$ are satisfied.

In this preferred embodiment, $CT_3$ is a thickness of the third lens element (130) near the optical axis, $ET_3$ is an edge thickness at the optical maximum effective radius of the third lens element (230), $Y_f$ is the optical maximum effective radius of the object-side surface (211) of the first lens element (210), $Y_r$ is the optical maximum effective radius of the image-side surface (242) of the fourth lens element (240), $T_{12}$ is an axial distance between the first lens element (210) and the second lens element (220), $T_{34}$ is an axial distance between the third lens element (230) and the fourth lens element (240), and the relations of $ET_3/CT_3=0.36$, $T_{34}/T_{12}=0.06$, and $Y_f/Y_r=0.97$ are satisfied. Refer to FIG. 20 (or Table 13) for related data of the aforementioned relations.

From the optical data listed in FIG. 10 (or Table 3) and the aberration curve as shown in FIG. 2B, good compensation effects on longitudinal spherical aberration, astigmatic field curving and distortion can be achieved by the optical lens assembly for image taking image in accordance with this preferred embodiment of the present invention.

Third Preferred Embodiment

Figure 3A:
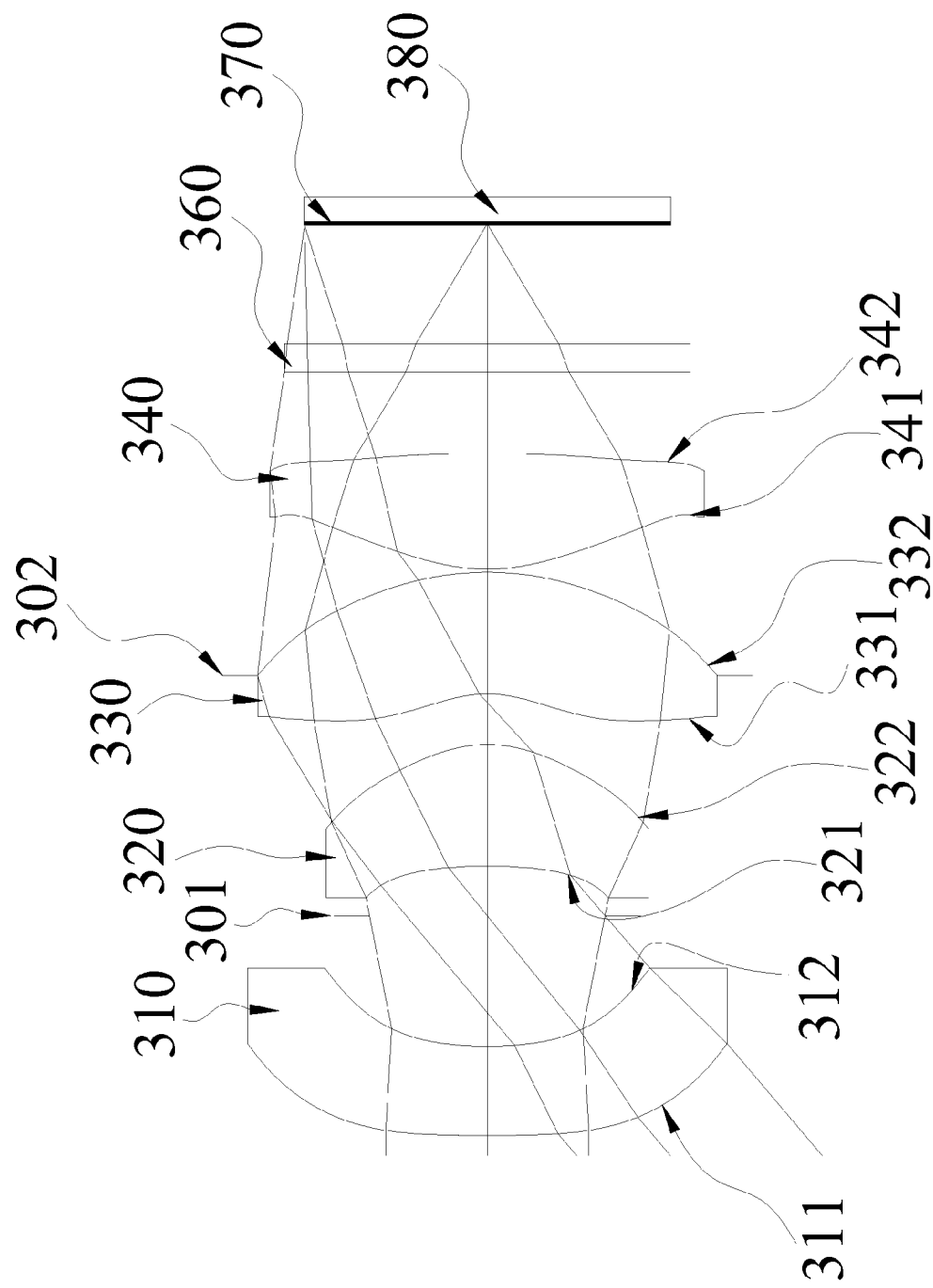
FIG. 3A is a schematic view of an optical lens assembly in accordance with the third preferred embodiment of the present invention.
Figure 3B:
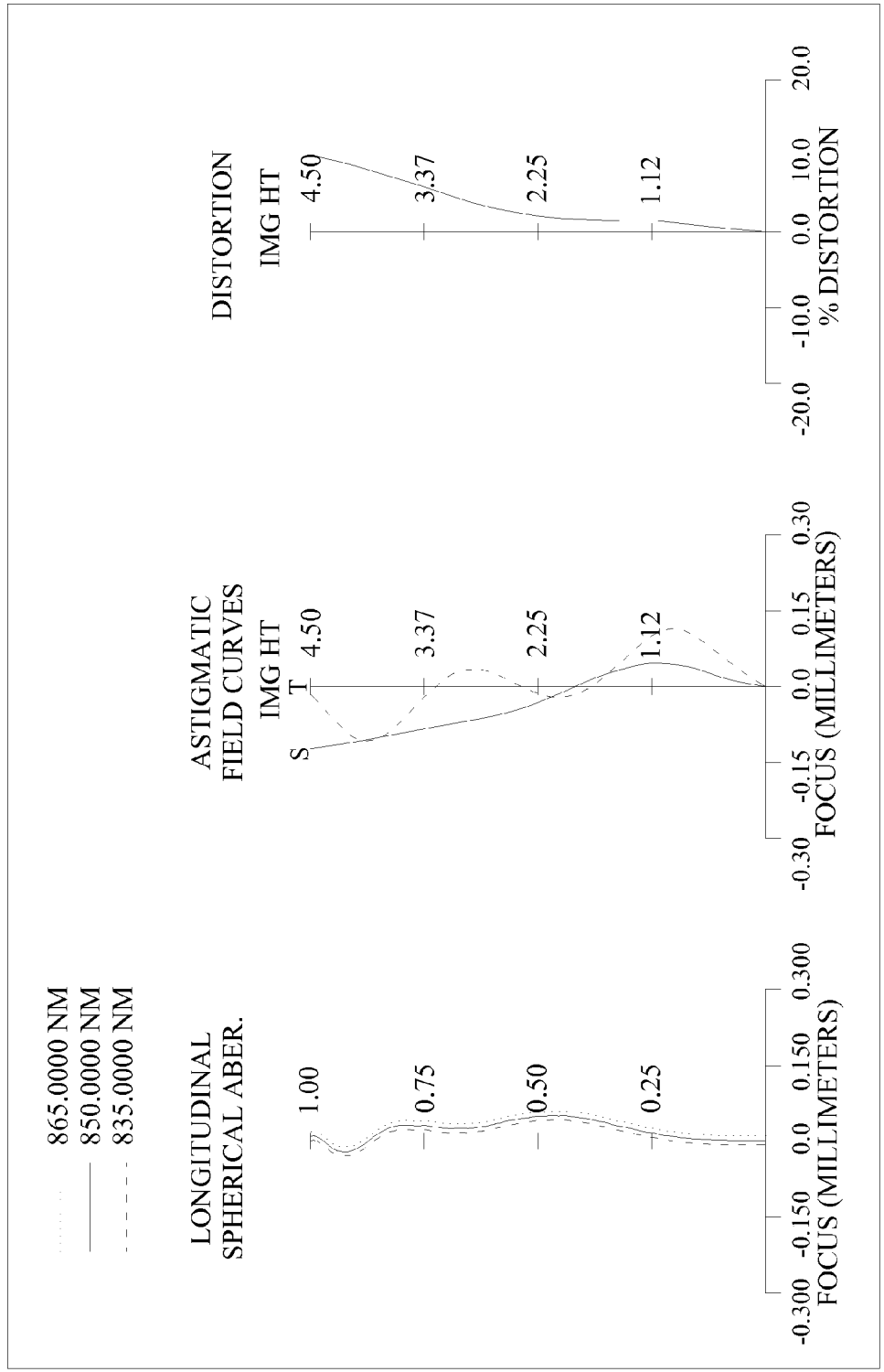
FIG. 3B is a series of aberration curves of an optical lens assembly in accordance with the third preferred embodiment of the present invention.

With reference to FIGS. 3A and 3B for a schematic view and a series of aberration curves of the optical lens assembly for image taking in accordance with the third preferred embodiment of the present invention respectively, the optical lens assembly for image taking of the third preferred embodiment comprises four lens elements, an aperture stop, a field stop, filter (360) and image sensor (380). In this preferred embodiment, a good aberration correction effect at the infrared wavelength can be achieved, and this embodiment can be applied for taking images within visible and infrared bands. The optical lens assembly for image taking of this preferred embodiment, sequentially arranged from an object side to an image side along an optical axis comprises: the first lens element (310) with negative refractive power, being a lens element made of a plastic material, and having a convex object-side surface (311) and a concave image-side surface (312), and both object-side surface (311) and image-side surface (312) being aspheric, and an aperture stop (301); the second lens element (320) with positive refractive power, being a lens element made of a plastic material, and having a concave object-side surface (321) and a convex image-side surface (322), and both object-side surface (321) and image-side surface (322) being aspheric; the third lens element (330) with negative refractive power, being a lens element made of a plastic material, and having a concave object-side surface (331) and a convex image-side surface (332), and both object-side surface (331) and image-side surface (332) being aspheric, and the object-side surface (331) having an inflection point; the fourth lens element (340) with positive refractive power, being a lens element made of a plastic material, and having a convex object-side surface (341) and a convex image-side surface (342), and both object-side surface (341) and image-side surface (342) being aspheric, and the object-side surface (341) having an inflection point and a field stop (302); a filter (360) made of a plate glass material for adjusting the range of the wavelength of the imaging light; and an image sensor (380) installed at an image plane (370). The material used for each lens element is listed in FIG. 12 (or Table 5).

With reference to FIG. 12 (or Table 5) for the optical data of this preferred embodiment, the object-side surface (311) and image-side surface (312) of the first lens element (310), the object-side surface (321) and image-side surface (322) of the second lens element (320), the object-side surface (331) and image-side surface (332) of the third lens element (330), and the object-side surface (341) and image-side surface (342) of the fourth lens element (340) satisfy the aspherical surface formula as given in Equation (16), and FIG. 13 (or Table 6) lists the aspherical surface coefficients.

In the optical lens assembly for image taking in accordance with the third preferred embodiment, the focal length of the whole image pickup optical system is f=4.84 (mm), the ratio of the focal length of the whole image pickup optical system to the entrance pupil diameter of the optical lens assembly for image taking is f/EPD=0.97, and half of the maximum view angle is HFOV=40.2 (degrees).

With reference to Table 5 for this preferred embodiment, if $CT_3$ is a thickness of the third lens element (330) near the optical axis of the optical lens assembly, $CT_4$ is a thickness of the fourth lens element (340) near the optical axis, SL is an axial distance from the aperture stop (301) to the image plane (370) of the optical lens assembly, TTL is an axial distance from the object-side surface (311) of the first lens element to the image plane (370), ImgH is half of the diagonal length of the effective photosensitive area of the image sensor (380), $DS_1$ is a distance from the image-side surface (311) of the first lens element (310) to the aperture stop (301) along the optical axis, $DS_2$ is a distance from the aperture stop (301) to the object-side surface (321) of the second lens element (320) along the optical axis, and the relations of $CT_3/CT_4$=1.05, SL/TTL=0.76, TTL/ImgH=4.95, and $DS_1/DS_2$=2.63 are satisfied.

In this preferred embodiment of the present invention, the optical lens assembly for image taking is applied to an infrared band, with related focal length and refractive index calculated according to the wavelength of 850.0 nm, wherein f is a focal length of the optical lens assembly for image taking, $f_1$ is a focal length of the first lens element (310), $f_2$ is a focal length of the second lens element (320), $R_5$ is a curvature radius of the object-side surface (331) of the third lens element (330), $R_6$ is a curvature radius of the image-side surface (332) of the third lens element (330), and the relations of $f/f_1$=−0.26, $f/f_2$=0.67, and $R_5/R_6$=0.38 are satisfied.

In this preferred embodiment, $CT_3$ is a thickness of the third lens element (130) near the optical axis, $ET_3$ is an edge thickness at the optical maximum effective radius of the third lens element (330), $Y_f$ is the optical maximum effective radius of the object-side surface (311) of the first lens element (310), $Y_r$ is the optical maximum effective radius of the image-side surface (342) of the fourth lens element (340), $T_{12}$ is an axial distance between the first lens element (310) and the second lens element (320), $T_{34}$ is an axial distance between the third lens element (330) and the fourth lens element (340), and the relations of $ET_3/CT_3$=0.34, $T_{34}/T_{12}$=0.02, and $Y_f/Y_r$=1.10 are satisfied. Refer to FIG. 20 (or Table 13) for related data of the aforementioned relations.

From the optical data listed in FIG. 12 (or Table 5) and the aberration curve as shown in FIG. 3B, good compensation effects on longitudinal spherical aberration, astigmatic field curving and distortion can be achieved by the optical lens assembly for image taking image in accordance with this preferred embodiment of the present invention.

Fourth Preferred Embodiment

Figure 4A:
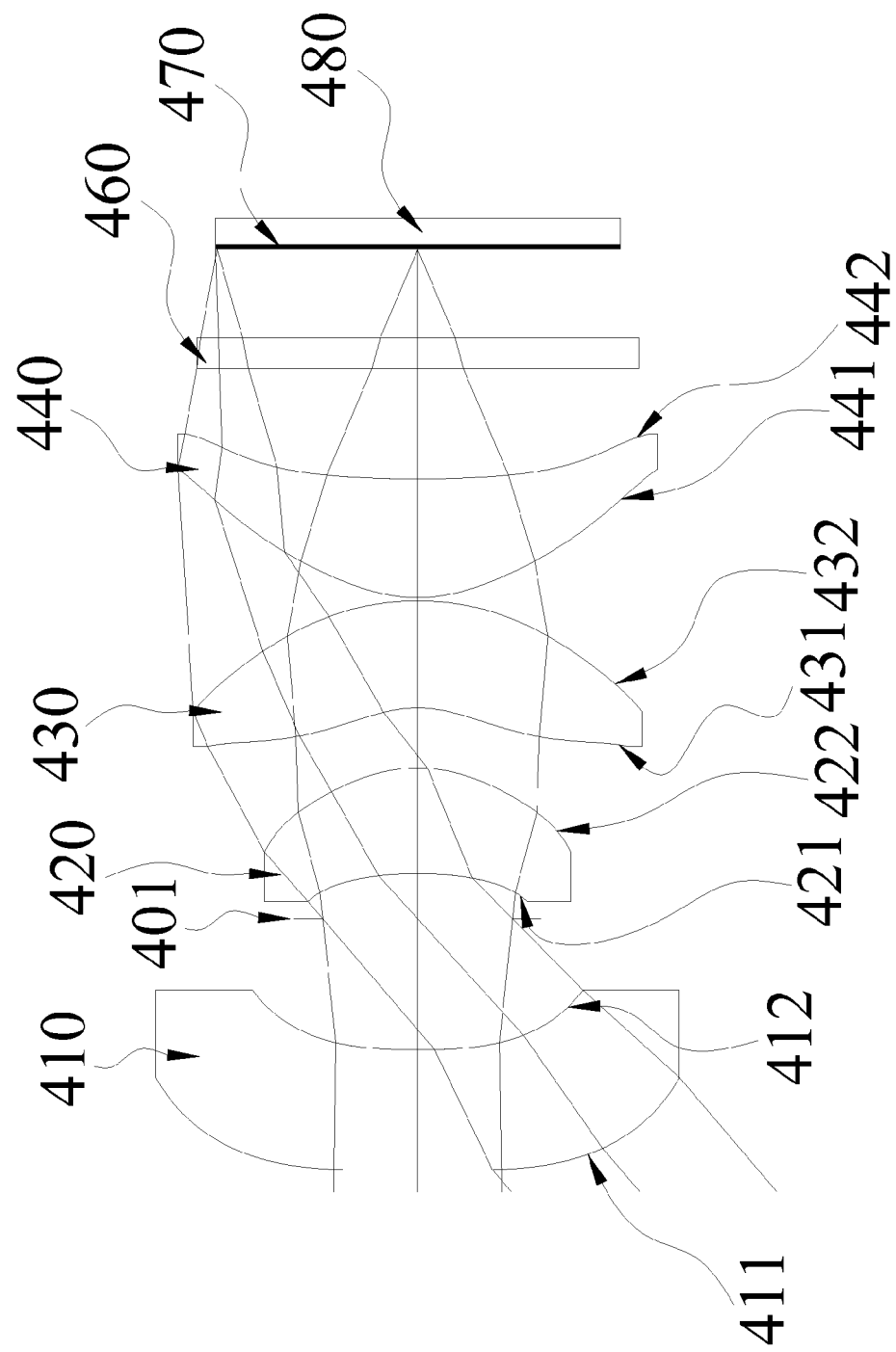
FIG. 4A is a schematic view of an optical lens assembly in accordance with the fourth preferred embodiment of the present invention.
Figure 4B:
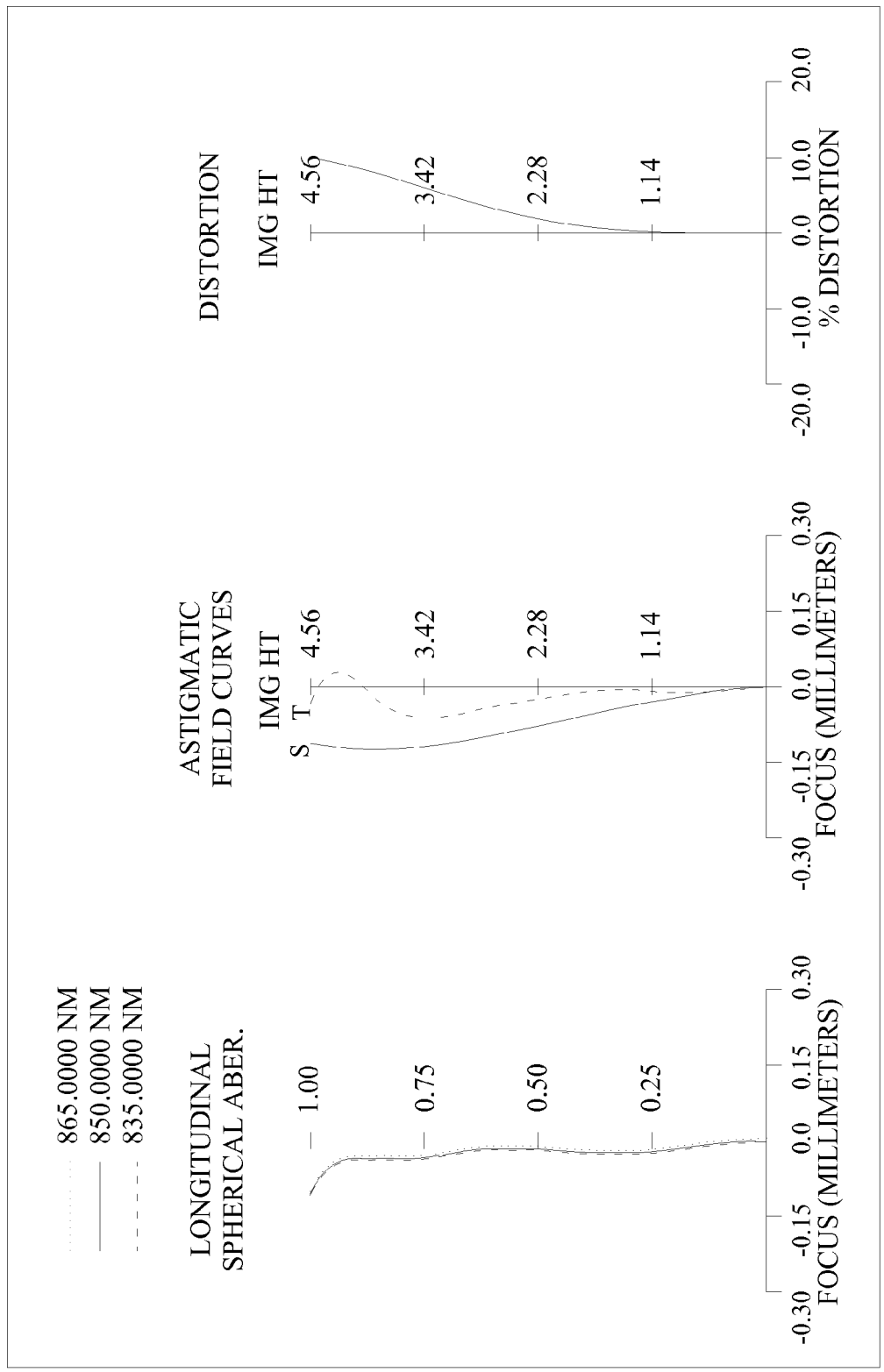
FIG. 4B is a series of aberration curves of an optical lens assembly in accordance with the fourth preferred embodiment of the present invention.

With reference to FIGS. 4A and 4B for a schematic view and a series of aberration curves of the optical lens assembly for image taking in accordance with the fourth preferred embodiment of the present invention respectively, the optical lens assembly for image taking of the fourth preferred embodiment comprises four lens elements, an aperture stop, a filter (460) and an image sensor (480). In this preferred embodiment, a good aberration correction effect at the infrared wavelength can be achieved, and this embodiment can be applied for taking images within visible and infrared bands. The optical lens assembly for image taking of this preferred embodiment, sequentially arranged from an object side to an image side along an optical axis comprises: the first lens element (410) with negative refractive power, being a lens element made of a plastic material, and having a concave object-side surface (411) and a concave image-side surface (412), and both object-side surface (411) and image-side surface (412) being aspheric, and an aperture stop (401); the second lens element (420) with positive refractive power, being a lens element made of a plastic material, and having a concave object-side surface (421) and a convex image-side surface (422), and both object-side surface (421) and image-side surface (422) being aspheric; the third lens element (430) with negative refractive power, being a lens element made of a plastic material, and having a concave object-side surface (431) and a convex image-side surface (432), and both object-side surface (431) and image-side surface (432) being aspheric, and the object-side surface (431) having an inflection point; the fourth lens element (440) with positive refractive power, being a lens element made of a plastic material, and having a convex object-side surface (441) and a concave image-side surface (442), and both object-side surface (441) and image-side surface (442) being aspheric, and the image-side surface (442) having an inflection point; a filter (460) made of a plate glass material for adjusting the range of the wavelength of the imaging light; and an image sensor (480) installed at an image plane (470). The material used for each lens element is listed in FIG. 14 (or Table 7).

With reference to FIG. 14 (or Table 7) for the optical data of this preferred embodiment, the object-side surface (411) and image-side surface (412) of the first lens element (410), the object-side surface (421) and image-side surface (422) of the second lens element (420), the object-side surface (431) and image-side surface (432) of the third lens element (430), and the object-side surface (441) and image-side surface (442) of the fourth lens element (440) satisfy the aspherical surface formula as given in Equation (16), and FIG. 15 (or Table 8) lists the aspherical surface coefficients.

In the optical lens assembly for image taking in accordance with the fourth preferred embodiment, the focal length of the whole image pickup optical system is f=4.90 (mm), the ratio of the focal length of the whole image pickup optical system to the entrance pupil diameter of the optical lens assembly for image taking is f/EPD=1.30, and half of the maximum view angle is HFOV=40.2 (degrees).

With reference to Table 7 for this preferred embodiment, if $CT_3$ is a thickness of the third lens element (430) near the optical axis of the optical lens assembly, $CT_4$ is a thickness of the fourth lens element (440) near the optical axis, SL is an axial distance from the aperture stop (401) to the image plane (470) of the optical lens assembly, TTL is an axial distance from the object-side surface (411) of the first lens element to the image plane (470), ImgH is half of the diagonal length of the effective photosensitive area of the image sensor (480), $DS_1$ is a distance from the image-side surface (411) of the first lens element (410) to the aperture stop (401) along the optical axis, $DS_2$ is a distance from the aperture stop (401) to the object-side surface (421) of the second lens element (420) along the optical axis, and the relations of $CT_3/CT_4=0.90$, $SL/TTL=0.73$, $TTL/ImgH=4.55$, and $DS_1/DS_2=2.90$ are satisfied.

In this preferred embodiment of the present invention, the optical lens assembly for image taking is applied to an infrared band, with related focal length and refractive index calculated according to the wavelength of 850.0 nm, wherein f is a focal length of the optical lens assembly for image taking, $f_1$ is a focal length of the first lens element (410), $f_2$ is a focal length of the second lens element (420), $R_5$ is a curvature radius of the object-side surface (431) of the third lens element (430), $R_6$ is a curvature radius of the image-side surface (432) of the third lens element (430), and the relations of $f/f_1=-0.20$, $f/f_2=0.59$, and $R_5/R_6=0.44$ are satisfied.

In this preferred embodiment, $CT_3$ is a thickness of the third lens element (130) near the optical axis, $ET_3$ is an edge thickness at the optical maximum effective radius of the third lens element (430), $Y_f$ is the optical maximum effective radius of the object-side surface (411) of the first lens element (410), $Y_r$ is the optical maximum effective radius of the image-side surface (442) of the fourth lens element (440), $T_{12}$ is an axial distance between the first lens element (410) and the second lens element (420), $T_{34}$ is an axial distance between the third lens element (430) and the fourth lens element (440), and the relations of $ET_3/CT_3=0.32$, $T_{34}/T_{12}=0.02$, and $Y_f/Y_r=1.12$ are satisfied. Refer to FIG. 20 (or Table 13) for related data of the aforementioned relations.

From the optical data listed in FIG. 14 (or Table 7) and the aberration curve as shown in FIG. 4B, good compensation effects on longitudinal spherical aberration, astigmatic field curving and distortion can be achieved by the optical lens assembly for image taking image in accordance with this preferred embodiment of the present invention.

Fifth Preferred Embodiment

Figure 5A:
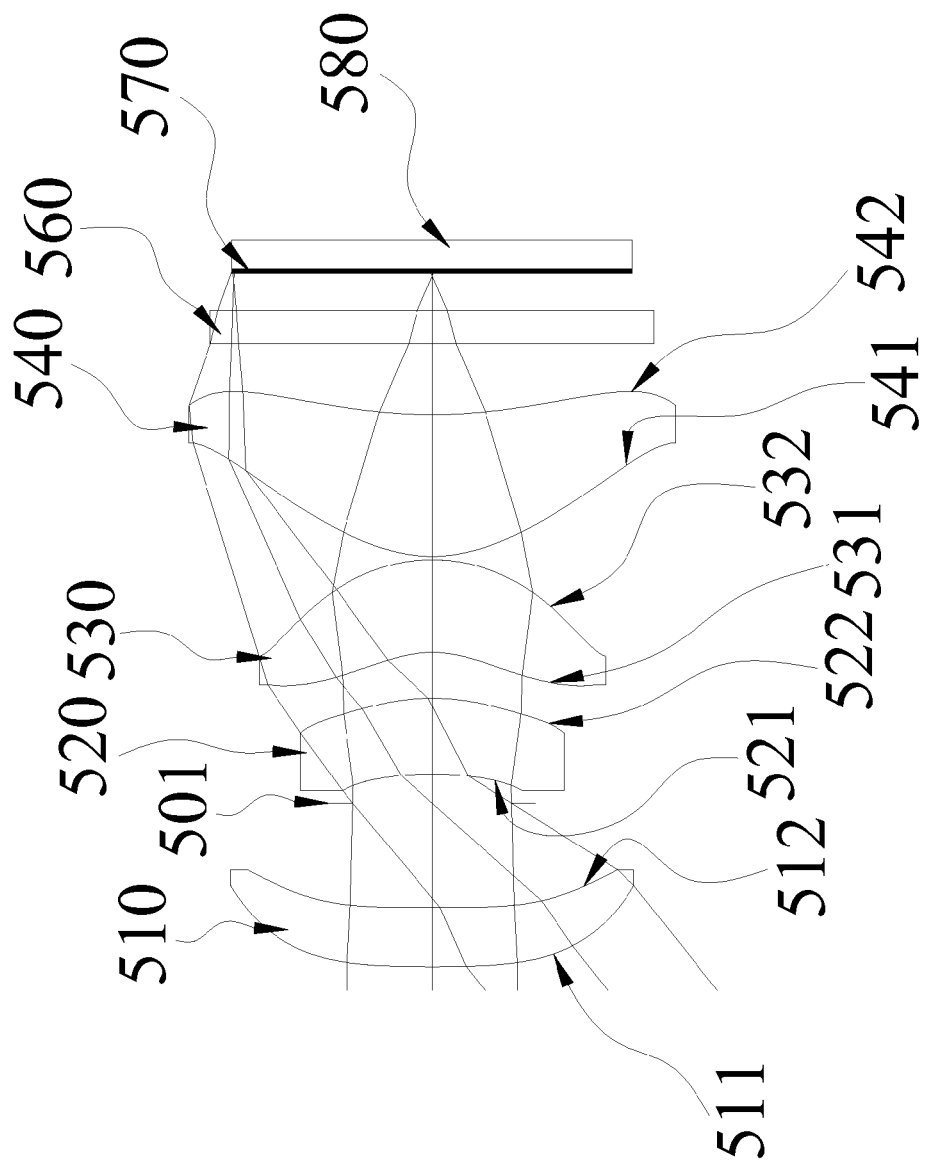
FIG. 5A is a schematic view of an optical lens assembly in accordance with the fifth preferred embodiment of the present invention.
Figure 5B:
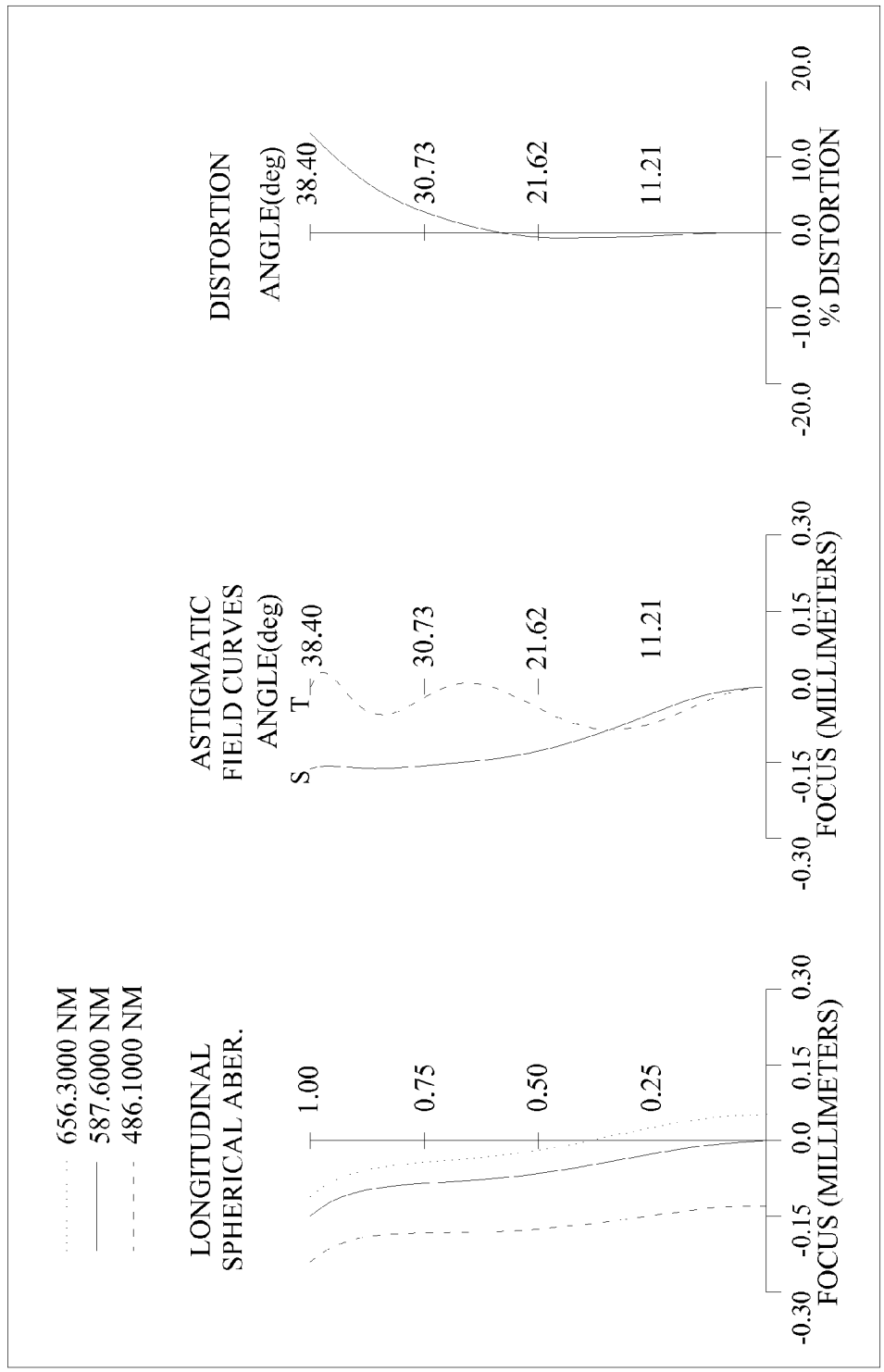
FIG. 5B is a series of aberration curves of an optical lens assembly in accordance with the fifth preferred embodiment of the present invention.

With reference to FIGS. 5A and 5B for a schematic view and a series of aberration curves of the optical lens assembly for image taking in accordance with the fifth preferred embodiment of the present invention respectively, the optical lens assembly for image taking of the fifth preferred embodiment comprises four lens elements, an aperture stop, a filter (560) and an image sensor (580). This preferred embodiment can be applied for taking images of a regular light. The optical lens assembly for image taking of this preferred embodiment, sequentially arranged from an object side to an image side along an optical axis comprises: the first lens element (510) with positive refractive power, being a lens element made of a plastic material, and having a convex object-side surface (511) and a convex image-side surface (512), and both object-side surface (511) and image-side surface (512) being aspheric, and an aperture stop (501); the second lens element (520) with positive refractive power, being a lens element made of a plastic material, and having a concave object-side surface (521) and a convex image-side surface (522), and both object-side surface (521) and image-side surface (522) being aspheric; the third lens element (530) with negative refractive power, being a lens element made of a plastic material, and having a concave object-side surface (531) and a convex image-side surface (532), and both object-side surface (531) and image-side surface (532) being aspheric and having an inflection point; the fourth lens element (540) with positive refractive power, being a lens element made of a plastic material, and having a convex object-side surface (541) and a concave image-side surface (542), and both object-side surface (541) and image-side surface (542) being aspheric having an inflection point; a filter (560) made of a plate glass material for adjusting the range of the wavelength of the imaging light; and an image sensor (580) installed at an image plane (570). The material used for each lens element is listed in FIG. 16 (or Table 9).

With reference to FIG. 16 (or Table 9) for the optical data of this preferred embodiment, the object-side surface (511) and image-side surface (512) of the first lens element (510), the object-side surface (521) and image-side surface (522) of the second lens element (520), the object-side surface (531) and image-side surface (532) of the third lens element (530), and the object-side surface (541) and image-side surface (542) of the fourth lens element (540) satisfy the aspherical surface formula as given in Equation (16), and FIG. 17 (or Table 10) lists the aspherical surface coefficients.

In the optical lens assembly for image taking in accordance with the fifth preferred embodiment, the focal length of the whole image pickup optical system is f=4.65 (mm), the ratio of the focal length of the whole image pickup optical system to the entrance pupil diameter of the optical lens assembly for image taking is f/EPD=1.30, and half of the maximum view angle is HFOV=38.4 (degrees).

With reference to Table 9 for this preferred embodiment, if $CT_3$ is a thickness of the third lens element (530) near the optical axis of the optical lens assembly, $CT_4$ is a thickness of the fourth lens element (540) near the optical axis, SL is an axial distance from the aperture stop (501) to the image plane (570) of the optical lens assembly, TTL is an axial distance from the object-side surface (511) of the first lens element to the image plane (570), ImgH is half of the diagonal length of the effective photosensitive area of the image sensor (580), $DS_1$ is a distance from the image-side surface (511) of the first lens element (510) to the aperture stop (501) along the optical axis, $DS_2$ is a distance from the aperture stop (501) to the object-side surface (521) of the second lens element (520) along the optical axis, and the relations of $CT_3/CT_4=0.65$, $SL/TTL=0.76$, $TTL/ImgH=3.48$ and $DS_1/DS_2=3.56$ are satisfied.

In this preferred embodiment, f is a focal length of the optical lens assembly for image taking, $f_1$ is a focal length of the first lens element (510), $f_2$ is a focal length of the second lens element (520), $R_5$ is a curvature radius of the object-side surface (531) of the third lens element (530), $R_6$ is a curvature radius of the image-side surface (532) of the third lens element (530), and the relations of $f/f_1=0.08$, $f/f_2=0.34$, and $R_5/R_6=0.67$ are satisfied.

In this preferred embodiment, $CT_3$ is a thickness of the third lens element (130) near the optical axis, $ET_3$ is an edge thickness at the optical maximum effective radius of the third lens element (530), $Y_f$ is the optical maximum effective radius of the object-side surface (511) of the first lens element (510), $Y_r$ is the optical maximum effective radius of the image-side surface (542) of the fourth lens element (540), $T_{12}$ is an axial distance between the first lens element (510) and the second lens element (520), $T_{34}$ is an axial distance between the third lens element (530) and the fourth lens element (540), and the relations of $ET_3/CT_3=0.30$, $T_{34}/T_{12}=0.02$, and $Y_f/Y_r=0.83$ are satisfied. Refer to FIG. 20 (or Table 13) for related data of the aforementioned relations.

From the optical data listed in FIG. 16 (or Table 9) and the aberration curve as shown in FIG. 5B, good compensation effects on longitudinal spherical aberration, astigmatic field curving and distortion can be achieved by the optical lens assembly for image taking image in accordance with this preferred embodiment of the present invention.

Sixth Preferred Embodiment

Figure 6A:
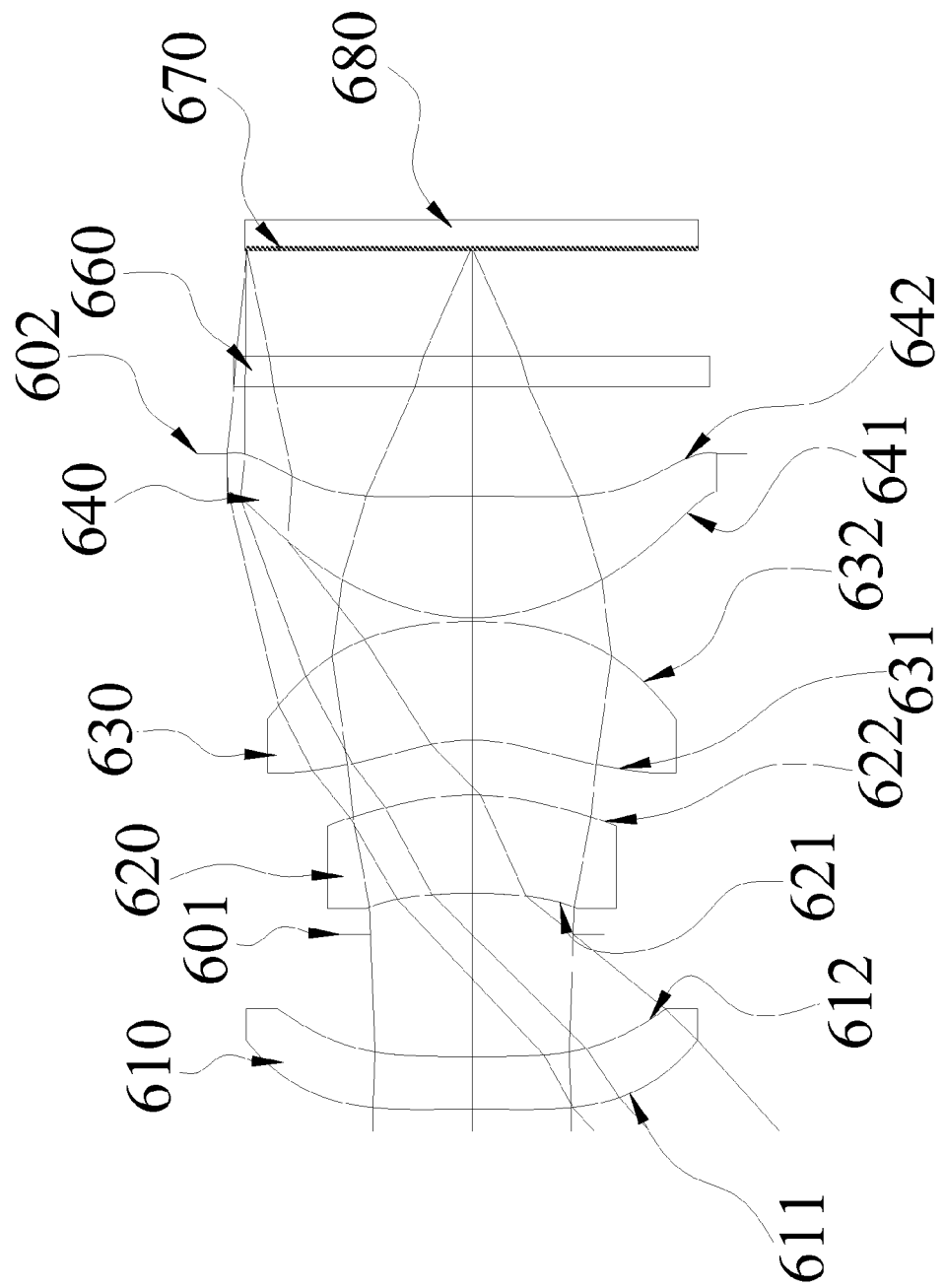
FIG. 6A is a schematic view of an optical lens assembly in accordance with the sixth preferred embodiment of the present invention.
Figure 6B:
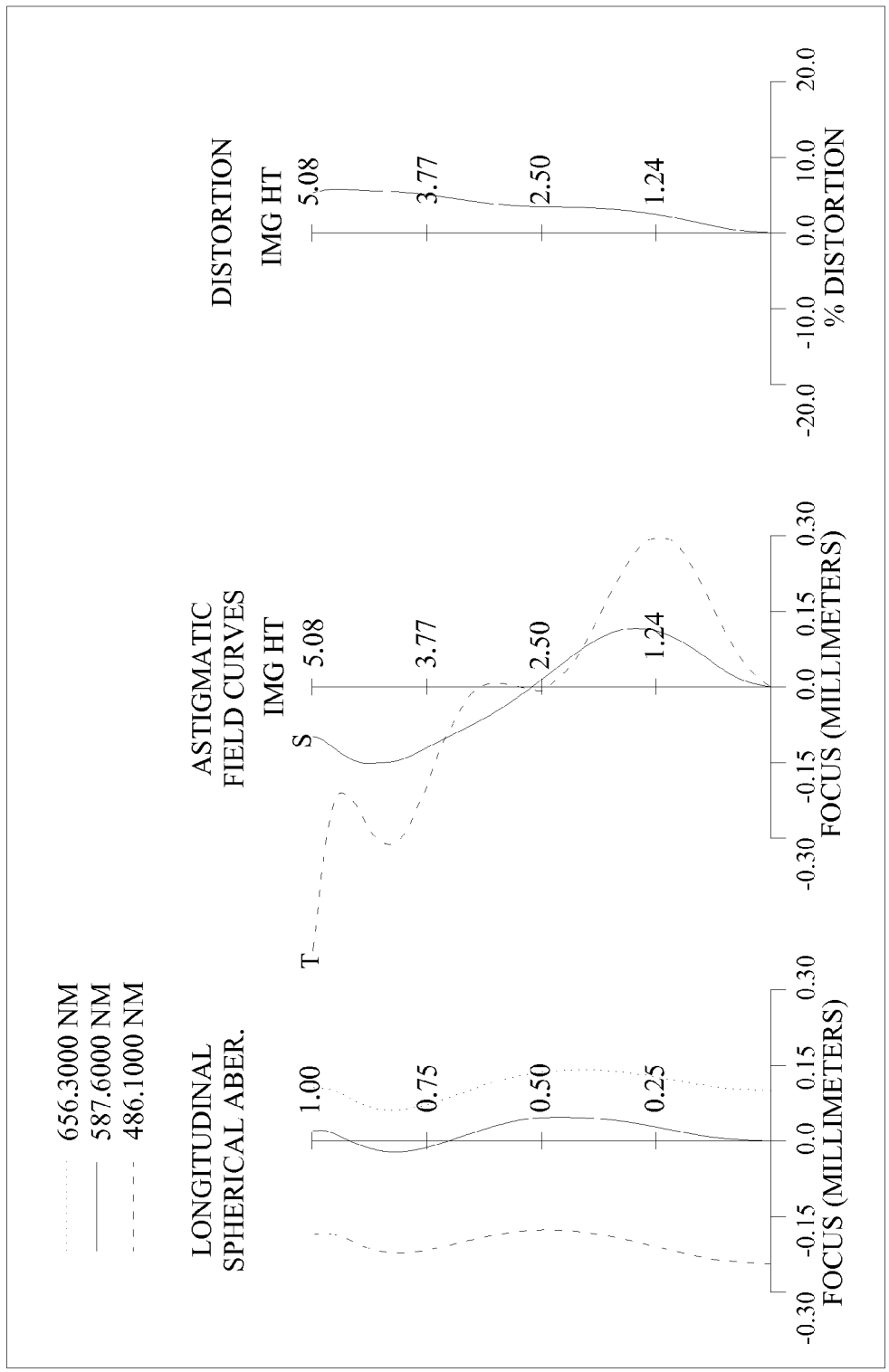
FIG. 6B is a series of aberration curves of an optical lens assembly in accordance with the sixth preferred embodiment of the present invention.

With reference to FIGS. 6A and 6B for a schematic view and a series of aberration curves of the optical lens assembly for image taking in accordance with the sixth preferred embodiment of the present invention respectively, the optical lens assembly for image taking of the sixth preferred embodiment comprises four lens elements, an aperture stop (601), a field stop (602), a filter (660) and an image sensor (680). This embodiment can be applied for taking images of a regular light, and a good aberration correction effect at the infrared wavelength can be achieved as well. The optical lens assembly for image taking of this preferred embodiment, sequentially arranged from an object side to an image side along an optical axis comprises: the first lens element (610) with negative refractive power, being a lens element made of a plastic material, and having a concave object-side surface (611) and a concave image-side surface (612), and both object-side surface (611) and image-side surface (612) being aspheric, and an aperture stop (601); the second lens element (620) with positive refractive power, being a lens element made of a plastic material, and having a concave object-side surface (621) and a convex image-side surface (622), and both object-side surface (621) and image-side surface (622) being aspheric; the third lens element (630) with negative refractive power, being a lens element made of a plastic material, and having a concave object-side surface (631) and a convex image-side surface (632), and both object-side surface (631) and image-side surface (632) being aspheric, and the object-side surface (631) having an inflection point; the fourth lens element (640) with positive refractive power, being a lens element made of a plastic material, and having a convex object-side surface (641) and a convex image-side surface (642), and both object-side surface (641) and image-side surface (642) being aspheric and having an inflection point and a field stop (602); a filter (660) made of a plate glass material for adjusting the range of the wavelength of the imaging light; and an image sensor (680) installed at an image plane (670). The material used for each lens element is listed in FIG. 18 (or Table 11).

With reference to FIG. 18 (or Table 11) for the optical data of this preferred embodiment, the object-side surface (611) and image-side surface (612) of the first lens element (610), the object-side surface (621) and image-side surface (622) of the second lens element (620), the object-side surface (631) and image-side surface (632) of the third lens element (630), and the object-side surface (641) and image-side surface (642) of the fourth lens element (640) satisfy the aspherical surface formula as given in Equation (16), and FIG. 19 (or Table 12) lists the aspherical surface coefficients.

In the optical lens assembly for image taking in accordance with the sixth preferred embodiment, the focal length of the whole image pickup optical system is f=5.44 (mm), the ratio of the focal length of the whole image pickup optical system to the entrance pupil diameter of the optical lens assembly for image taking is f/EPD=1.20, and half of the maximum view angle is HFOV=42.0 (degrees).

With reference to Table 11 for this preferred embodiment, if $CT_3$ is a thickness of the third lens element (630) near the optical axis of the optical lens assembly, $CT_4$ is a thickness of the fourth lens element (640) near the optical axis, SL is an axial distance from the aperture stop (601) to the image plane (670) of the optical lens assembly, TTL is an axial distance from the object-side surface (611) of the first lens element to the image plane (670), ImgH is half of the diagonal length of the effective photosensitive area of the image sensor (680), $DS_1$ is a distance from the image-side surface (611) of the first lens element (610) to the aperture stop (601) along the optical axis, $DS_2$ is a distance from the aperture stop (601) to the object-side surface (621) of the second lens element (620) along the optical axis, and the relations of $CT_3/CT_4=0.97$, $SL/TTL=0.79$, $TTL/ImgH=3.78$ and $DS_1/DS_2=2.95$ are satisfied.

In this preferred embodiment, f is a focal length of the optical lens assembly for image taking, $f_1$ is a focal length of the first lens element (610), $f_2$ is a focal length of the second lens element (620), $R_5$ is a curvature radius of the object-side surface (631) of the third lens element (630), $R_6$ is a curvature radius of the image-side surface (632) of the third lens element (630), and the relations of $f/f_1=-0.08$, $f/f_2=0.34$, and $R_5/R_6=0.42$ are satisfied.

In this preferred embodiment, $CT_3$ is a thickness of the third lens element (130) near the optical axis, $ET_3$ is an edge thickness at the optical maximum effective radius of the third lens element (630), $Y_f$ is the optical maximum effective radius of the object-side surface (611) of the first lens element (610), $Y_r$ is the optical maximum effective radius of the image-side surface (642) of the fourth lens element (640), $T_{12}$ is an axial distance between the first lens element (610) and the second lens element (620), $T_{34}$ is an axial distance between the third lens element (630) and the fourth lens element (640), and the relations of $ET_3/CT_3=0.45$, $T_{34}/T_{12}=0.02$, and $Y_f/Y_r=0.92$ are satisfied. Refer to FIG. 20 (or Table 13) for related data of the aforementioned relations.

From the optical data listed in FIG. 18 (or Table 11) and the aberration curve as shown in FIG. 6B, good compensation effects on longitudinal spherical aberration, astigmatic field curving and distortion can be achieved by the optical lens assembly for image taking image in accordance with this preferred embodiment of the present invention.

In the optical lens assembly for image taking of the present invention, a lens can be made of a glass or plastic material. If the lens is made of a glass material, the refractive power for the optical lens assembly for image taking can be configured with higher flexibility. If the lens is made of a plastic material, the production cost can be reduced effectively. In addition, an aspherical surface is formed on an optical surface of the lens, and the aspherical surface can be easily manufactured into a shape other than that of a spherical surface to have more control factors to eliminate or reduce aberrations, so as to reduce the number of lenses used and the total length of the optical lens assembly for image taking of the present invention.

In the optical lens assembly for image taking of the present invention, if a lens surface is convex, the lens surface proximate to the axis is convex; and if a lens surface is concave surface, the lens surface proximate to the axis is concave.

Tables 1 to 14 (corresponding to FIGS. 8 to 21 respectively) show changes of values of an optical lens assembly for image taking in accordance with a preferred embodiment of the present invention. However, the changes of values in the preferred embodiments of the present invention are obtained from experiments. Even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

It is noteworthy to point out that the aforementioned description and the illustration of related drawings are provided for the purpose of explaining the technical characteristics of the present invention, but not intended for limiting the scope of the present invention.

While the invention has been described by means of specific embodiments, numerous modifications and variations could be made thereto by those generally skilled in the art without departing from the scope and spirit of the invention set forth in the claims.

What is claimed is:

1. An optical lens assembly for image taking, sequentially arranged from an object side to an image side, comprising:
   a first lens element with refractive power;
   a second lens element with positive refractive power;
   a third lens element with negative refractive power, having a concave object-side surface and a convex image-side surface, and at least one of the object-side surface and image-side surface of the third lens element being aspheric;
   a fourth lens element with positive refractive power, having a convex object-side surface, and at least one of the object-side surface and an image-side surface of the fourth lens element being aspheric; wherein the optical lens assembly for image taking further comprises a stop;
   wherein, $CT_3$ is a thickness of the third lens element near the optical axis, $CT_4$ is a thickness of the fourth lens element near the optical axis, f is a focal length of the optical lens assembly for image taking, EPD is an entrance pupil diameter of the optical lens assembly for image taking, and the following relations are satisfied:

$0.5<CT_3/CT_4<1.5;$ $f/EPD<1.8.$

2. The optical lens assembly for image taking as recited in claim 1, wherein SL is an axial distance from the stop to an image plane of the optical lens assembly for image taking, TTL is an axial distance from the object-side surface of the first lens element to the image plane, and the following relation is satisfied:

$0.65<SL/TTL<0.85.$

3. The optical lens assembly for image taking as recited in claim 2, wherein the third lens element is made of a plastic material, and at least one of the object-side surface and image-side surface of the third lens element has at least one inflection point, and the fourth lens element being made of a plastic material.

4. The optical lens assembly for image taking as recited in claim 3, further comprising an image sensor at the image plane for imaging an object, wherein TTL is the axial distance from the object-side surface of the first lens element to the image plane, ImgH is half of the diagonal length of an effective photosensitive area of the image sensor, and the following relation is satisfied:

$TTL/ImgH<8.0.$

5. The optical lens assembly for image taking as recited in claim 4, wherein f is the focal length of the optical lens assembly for image taking, EPD is the entrance pupil diameter of the optical lens assembly for image taking, and the following relation is satisfied:

$f/EPD<1.4.$

6. The optical lens assembly for image taking as recited in claim 5, wherein the first lens element with negative refractive power has a convex object-side surface and a concave image-side surface, and $R_5$ is a curvature radius of the object-side surface of the third lens element, and $R_6$ is a curvature radius of the image-side surface of the third lens element, and the following relation is satisfied:

$0.1<R_5/R_6<0.8.$

7. The optical lens assembly for image taking as recited in claim 5, wherein $CT_3$ is the thickness of the third lens element near the optical axis, $CT_4$ is the thickness of the fourth lens element near the optical axis, and the following relation is satisfied:

$0.7<CT_3/CT_4<1.2.$

8. The optical lens assembly for image taking as recited in claim 5, wherein $DS_1$ is a distance from the nearest lens surface of the object side of the stop to the stop along the optical axis, $DS_2$ is a distance from the nearest lens surface of the image side of the stop to the stop along the optical axis, and the following relation is satisfied:

$2.0<DS_1/DS_2<4.0.$

9. The optical lens assembly for image taking as recited in claim 5, wherein f is the focal length of the optical lens assembly for image taking, $f_2$ is a focal length of the second lens element, and the following relation is satisfied:

$0.2<f/f_2<1.0.$

10. The optical lens assembly for image taking as recited in claim 9, wherein f is the focal length of the optical lens assembly for image taking, $f_1$ is a focal length of the first lens element, and the following relation is satisfied:

$-0.5<f/f_1<0.2.$

11. The optical lens assembly for image taking as recited in claim 4, wherein f is the focal length of the optical lens assembly for image taking, EPD is the entrance pupil diameter of the optical lens assembly for image taking, and the following relation is preferably satisfied:

$f/EPD<1.2.$

12. The optical lens assembly for image taking as recited in claim 4, wherein $CT_3$ is the thickness of the third lens element near the optical axis, $ET_3$ is an edge thickness at the optical maximum effective radius of the third lens element, and the following relation is satisfied:

$0.05<ET_3/CT_3<0.60.$

13. The optical lens assembly for image taking as recited in claim 12, wherein Yf is the optical maximum effective radius of the object-side surface of the lens element closest to the object side of the optical lens assembly for image taking, Yr is the optical maximum effective radius of the image-side surface of the lens element closest to the image side of the optical lens assembly for image taking closest to the image plane, and the following relation is satisfied:

$0.75<Yf/Yr<1.30.$

14. The optical lens assembly for image taking as recited in claim 12, wherein $T_{12}$ is an axial distance between the first lens element and the second lens element, $T_{34}$ is an axial distance between the third lens element and the fourth lens element, and the following relation is satisfied:

$0<T_{34}/T_{12}<0.1.$

15. An optical lens assembly for image taking, sequentially arranged from an object side to an image side, comprising:
   a first lens element with negative refractive power;
   a second lens element with positive refractive power, having a convex image-side surface;
   a third lens element with negative refractive power, having a concave object-side surface and a convex image-side surface, and at least one of the object-side surface and image-side surface of the third lens element being aspheric;
   a fourth lens element with positive refractive power, having a convex object-side surface, and at least one of the object-side surface and an image-side surface of the fourth lens element being aspheric; and wherein the optical lens assembly for image taking further comprises a stop;
   wherein $CT_3$ is a thickness of the third lens element near the optical axis, $CT_4$ is a thickness of the fourth lens element near the optical axis, f is a focal length of the optical lens assembly for image taking, $f_2$ is a focal length of the second lens element, SL is an axial distance from the stop to an image plane of the optical lens assembly for image taking, TTL is an axial distance from the object-side surface of the first lens element to the image plane, and the following relations are satisfied:

$0.5 < CT_3/CT_4 < 1.5$;

$0.2 < f/f_2 < 1.0$;

$0.65 < SL/TTL < 0.85$.

16. The optical lens assembly for image taking as recited in claim 15, wherein the second lens element has a concave object-side surface, and the fourth lens element is made of a plastic material.

17. The optical lens assembly for image taking as recited in claim 16, wherein $R_5$ is a curvature radius of the object-side surface of the third lens element, $R_6$ is a curvature radius of the image-side surface of the third lens element, and the following relation is satisfied:

$0.1 < R_5/R_6 < 0.8$.

18. The optical lens assembly for image taking as recited in claim 16, wherein f is the focal length of the optical lens assembly for image taking, $f_1$ is a focal length of the first lens element, and the following relation is satisfied:

$-0.5 < f/f_1 < 0.2$.

19. The optical lens assembly for image taking as recited in claim 16, wherein f is the focal length of the optical lens assembly for image taking, $f_2$ is the focal length of the second lens element, and the following relation is preferably satisfied:

$0.3 < f/f_2 < 0.8$.

20. The optical lens assembly for image taking as recited in claim 16, wherein Yf is the optical maximum effective radius of the object-side surface of the lens element closest to the object side of the optical lens assembly for image taking, Yr is the optical maximum effective radius of the image-side surface of the lens element closest to the image side of the optical lens assembly for image taking, and the following relation is satisfied:

$0.75 < Yf/Yr < 1.30$.

21. The optical lens assembly for image taking as recited in claim 16, wherein $CT_3$ is the thickness of the third lens element near the optical axis, $ET_3$ is an edge thickness at the optical maximum effective radius of the third lens element, and the following relation is satisfied:

$0.05 < ET_3/CT_3 < 0.60$.

22. The optical lens assembly for image taking as recited in claim 16, wherein f is the focal length of the optical lens assembly for image taking, EPD is an entrance pupil diameter of the optical lens assembly for image taking, and the following relation is satisfied:

$f/EPD < 1.8$.

23. The optical lens assembly for image taking as recited in claim 22, wherein $T_{12}$ is an axial distance between the first lens element and the second lens element, $T_{34}$ is an axial distance between the third lens element and the fourth lens element, and the following relation is satisfied:

$0 < T_{34}/T_{12} < 0.1$.

* * * * *